United States Patent [19]

Corbin et al.

[11] 4,078,685
[45] Mar. 14, 1978

[54] MOBILE BIN APPARATUSES AND PROCESS OF OPERATION THEREOF

[75] Inventors: Monty K. Corbin, Bovina; Waylan D. Hukill, Farwell, both of Tex.

[73] Assignee: Allied Products Corporation, Chicago, Ill.

[21] Appl. No.: 706,818

[22] Filed: Jul. 19, 1976

[51] Int. Cl.² ............................................. B60P 1/00
[52] U.S. Cl. ................................. 214/519; 214/83.1
[58] Field of Search ........................... 214/518–522, 214/83.1, 83.32, 17 D

[56] References Cited

U.S. PATENT DOCUMENTS

| | | | |
|---|---|---|---|
| 2,614,893 | 10/1952 | Merrill et al. | 214/83.1 |
| 2,647,525 | 8/1953 | Duda et al. | 214/83.1 |
| 2,676,721 | 4/1954 | Hansen | 214/519 |
| 2,796,185 | 6/1957 | Bernstein | 214/519 |
| 3,460,698 | 8/1969 | Harris | 214/519 |

*Primary Examiner*—Robert J. Spar
*Assistant Examiner*—Lawrence E. Williams
*Attorney, Agent, or Firm*—Ely Silverman

[57] ABSTRACT

A mobile field bin of such large size and unloading features as to provide economically significant convenient and reliable feed to road transport container vehicles has wall and wheel support and adjustment structures and operations that provides for particularly improved road transport and ready location characteristics and unloading operation.

5 Claims, 28 Drawing Figures

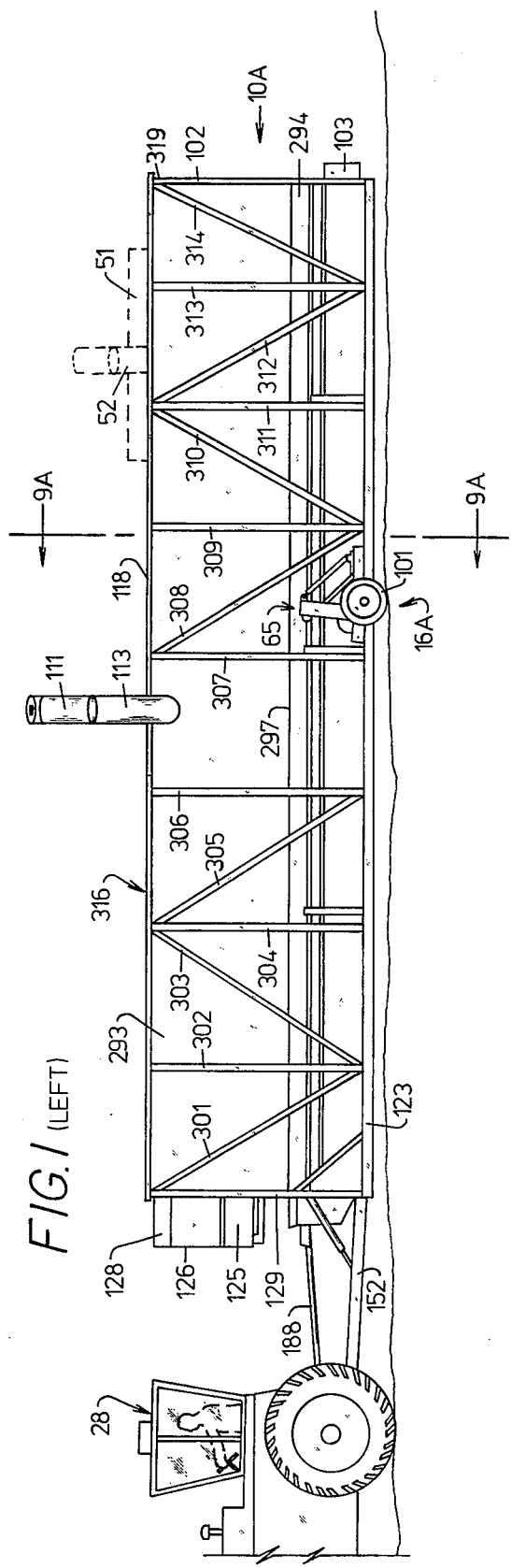
FIG.1 (LEFT)
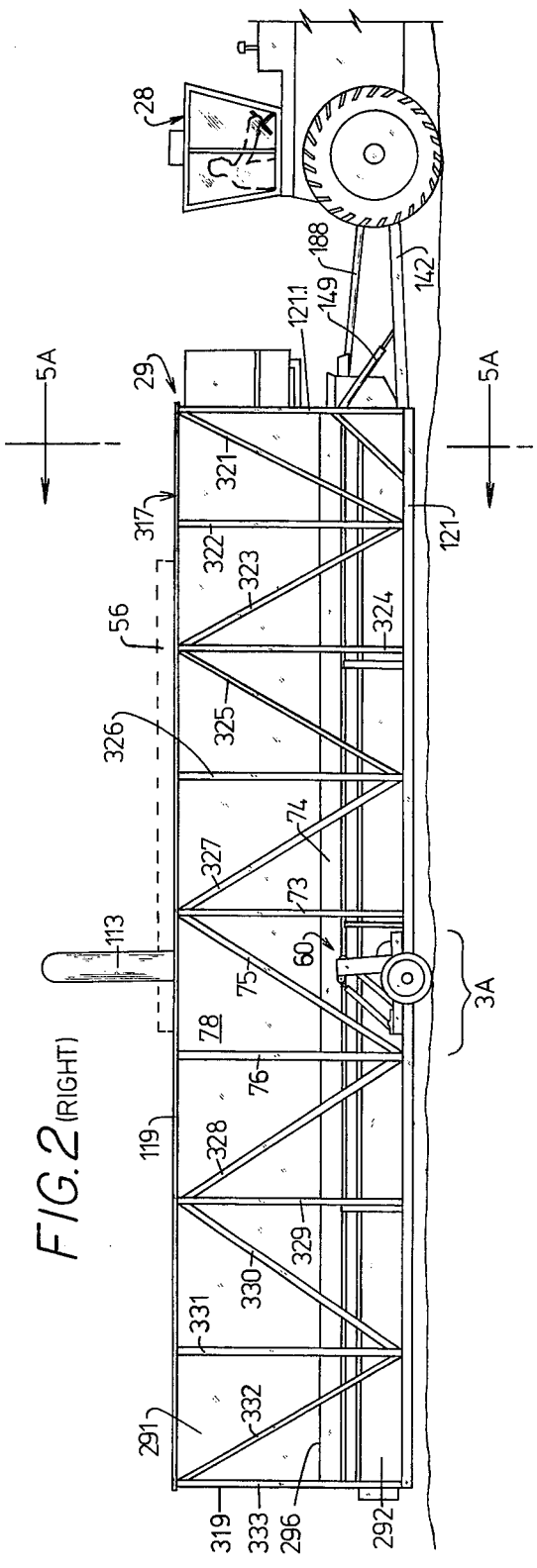
FIG.2 (RIGHT)

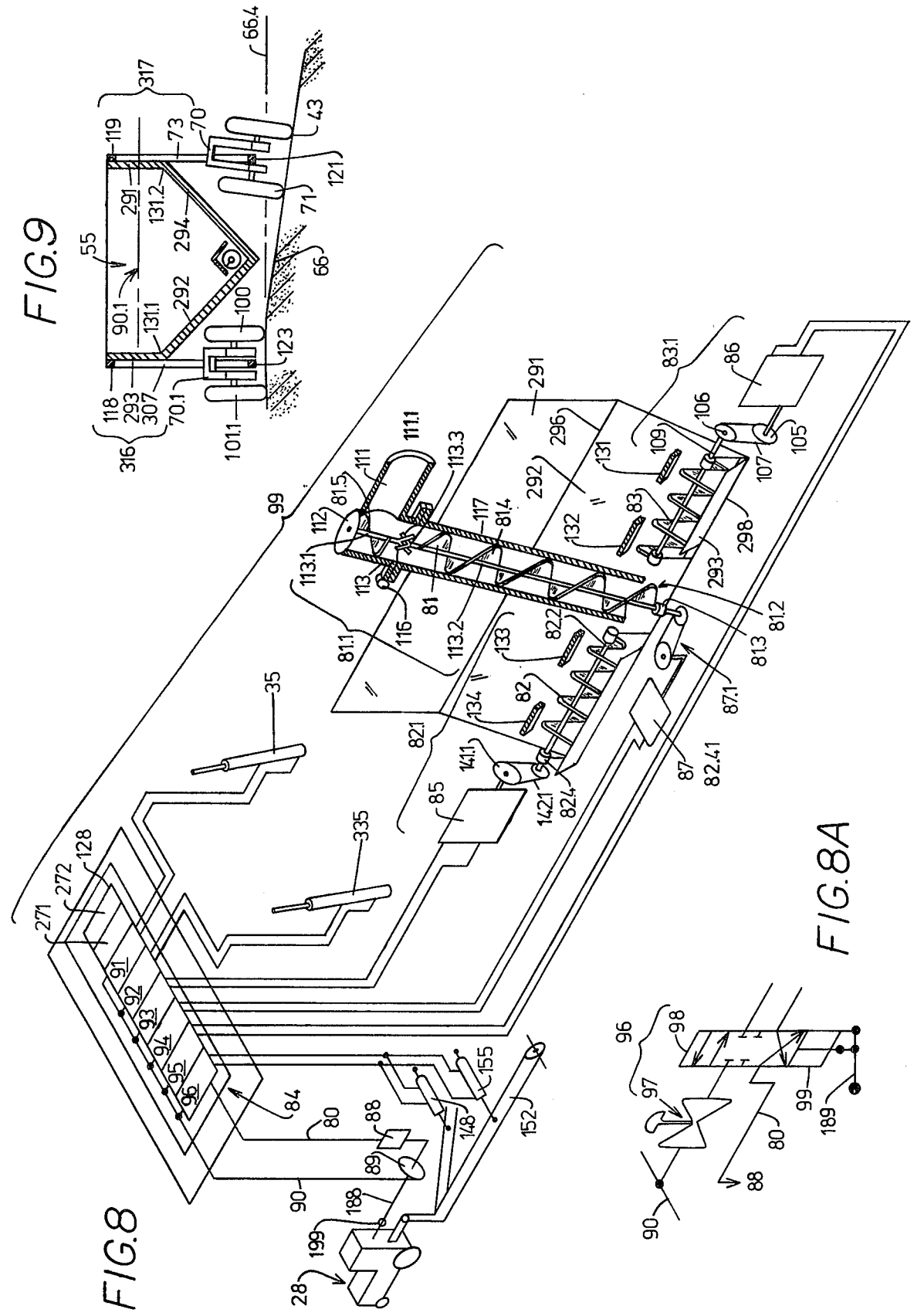

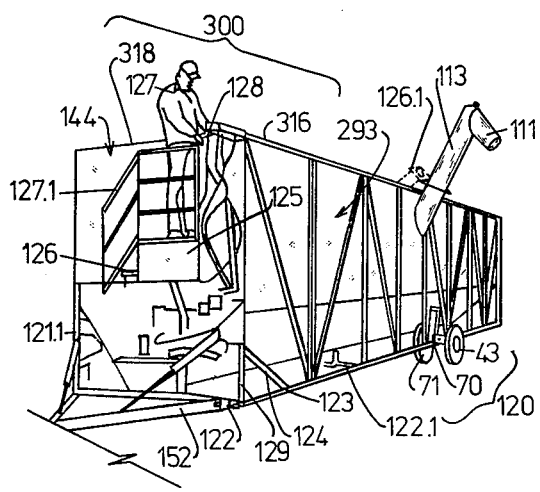

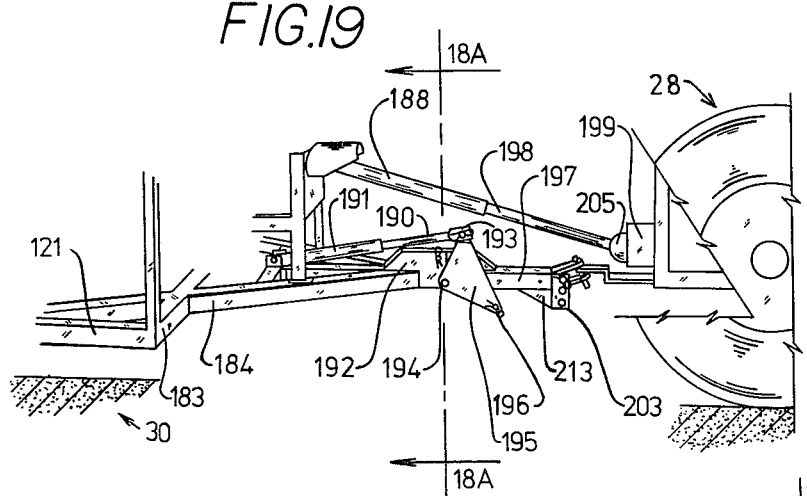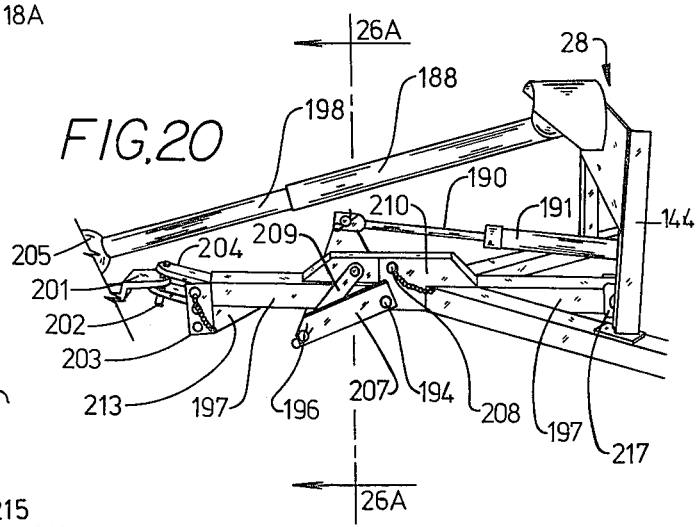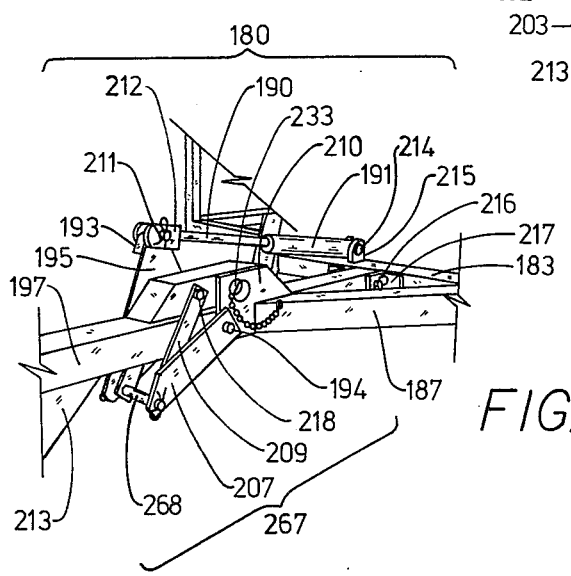

FIG.22
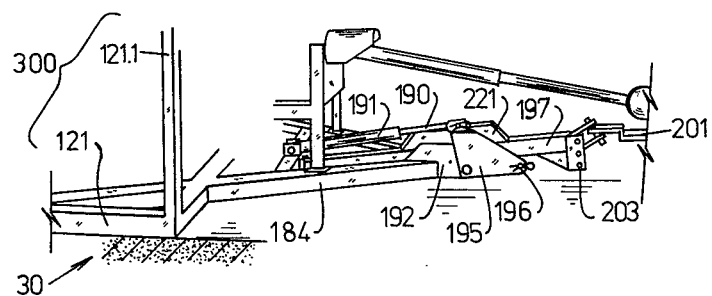
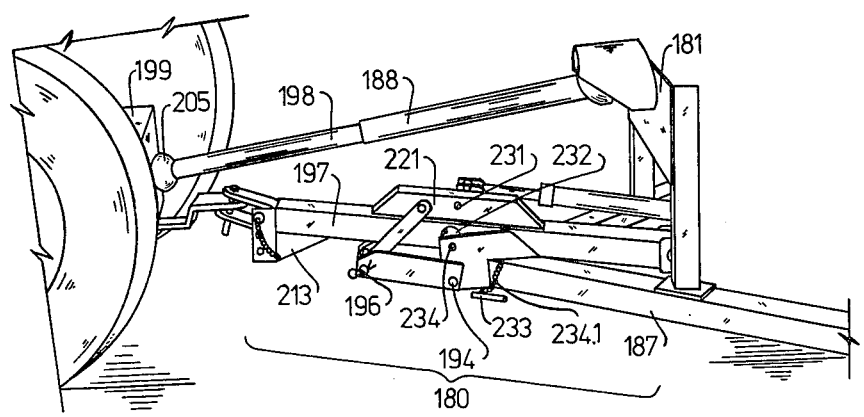
FIG.23
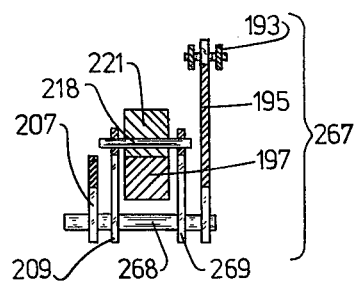
FIG.26

MOBILE BIN APPARATUSES AND PROCESS OF OPERATION THEREOF

BACKGROUND OF THE INVENTION

1. The Field of the Invention

The fields of art to which this invention relates are: Material-handling and Self-unloading vehicles with conveyors and successive handling means.

2. Description of the Prior Art

The prior art has not provided a combination of adequate volumetric capacity and readily transported and located bins: the instant apparatus and operations overcome such failings. Exemplary patents of such prior art are U.S. Pat. Nos. 3,806,475; 3,460,698; 3,455,475; 3,488,866; and 2,834,493.

SUMMARY OF THE INVENTION

A mobile bin of large capacity holds meaningful large volumes and provides mixing and thereby provides reliable, steady, and hence economic feed to large road transportation trucks. This mobile bin is readily located between accommodation of the large weight of material held thereby while still providing for ready transportability of such structure is accomplished by use of particularly located vertically extensible wheel support and positioning structures whereby such wheels may be extending to ground contacting transport position when the bin is empty, while wheels are withdrawn and the frame of the bin in used to support the weight of the contents in the bin when the bin is to be filled with grain and used as a holding structure between field gathering vehicles and road transport vehicles.

As transportation to the locations at which the mobile field bin is usually used is usually along unpaved and or crowned roads, and tilting of such a bin structure parallel to the road surface and concomitant poor drawing or trailing characteristics would render the entire apparatus unreliable, is unsafe or impractable for the above purposes, such tilting avoided by wheel adjustment and support structures that are particularly located with their zones of ground support or contact symmetrically located about the vertical plane including the side wall and wall frames to which attached and the plane of vertical adjustment movement of such wheels with respect to each bin side wall to which attached is also in the plane of such wall or wall frame. Thereby the transversely spaced vertical bin walls may located at different heights relative to the sloped road or ground along which such mobile bin is drawn during transport along a sloped or crowned road whereby the wheels and the bin frame walls are able to be maintained so oriented to the vertical, as to provide greatly improved reliability and ease and safety in tracking or trailing characteristics of such wheeled bins in view of the particularly dimensionally stable side wall and frame structure provided.

BRIEF DESCRIPTION OF THE DRAWINGS

FIG. 1 is a side view of the mobile bin assembly 29 in its elevated mobile condition on a road 30 in combination with a tractor (28) as seen from the left side.

FIG. 2 is a view of the apparatus combination of FIG. 1 as seen from the right side.

FIG. 8 is an overall diagrammatic view of the hydraulic system of the apparatus 29. FIG. 8A is a portion thereof.

FIG. 9 is a diagrammatic vertical transverse section through vertical plane 9A—9A of with apparatus 28 on a crowned road 66.

FIG. 12 is an oblique perspective and pictorial view of the apparatus 29 from the left side and front thereof with an operator in position for operation of the apparatus 29.

FIG. 13 is a view of the interior of the compartment 50 as seen by the operator 127 when that bin compartment is empty.

FIGS. 19, 20, and 21 are views of the drawbar assembly 180.1 in the raised position of the bin frame as shown by frame number 182. FIG. 19 is a view from the right hand side thereof as shown along direction of the arrow 19A of FIG. 18 in the raised position of the drawbar. FIG. 20 is a view along the direction of the arrow 20A of FIG. 18 to show the drawbar-raising apparatus as seen from the left hand side thereof in the raised position of the drawbar assembly. FIG. 21 is a close-up front left side oblique view of the drawbar control linkage during the raised bin position of that draw bar assembly 180.

FIG. 22 is a view of the drawbar assembly as seen from the left side thereof viewed from direction 19A of FIG. 18 when the drawbar control linkage assembly is in its made for lowered position of the bin 30.

FIG. 23 is a view from the right hand side of the drawbar assembly; i.e. as seen along the direction of arrow 20A in the position of the parts of the linkage assembly when the bin is raised.

FIG. 26 is a diagrammatic sectional view through vertical transverse plane 26A—26A of FIG. 19. looking forward in direction of arrows 26A—26A.

In the figures and text the term "left" refers to the side of the apparatus 29 on the left hand side of a driver (59.4) of FIG. 1 and the term "right" refers to side of the apparatus on the right hand side of the driver (59.4) of FIGS. 1 and 2, which driver is shown as facing in the direction of forward movement of the tractor 28, forward being to the left as shown in FIG. 1, and forward being to the right as shown in FIG. 2. FIGS. 1 and 2 are to scale and at the same scale. FIGS. 3 and 4 and 6 and 7 are to scale and to the same scale. FIGS. 10–25 are pictorial and, with allowance for perspective, to scale; FIGS. 16 and 17 are to the same scale.

Figure 3:
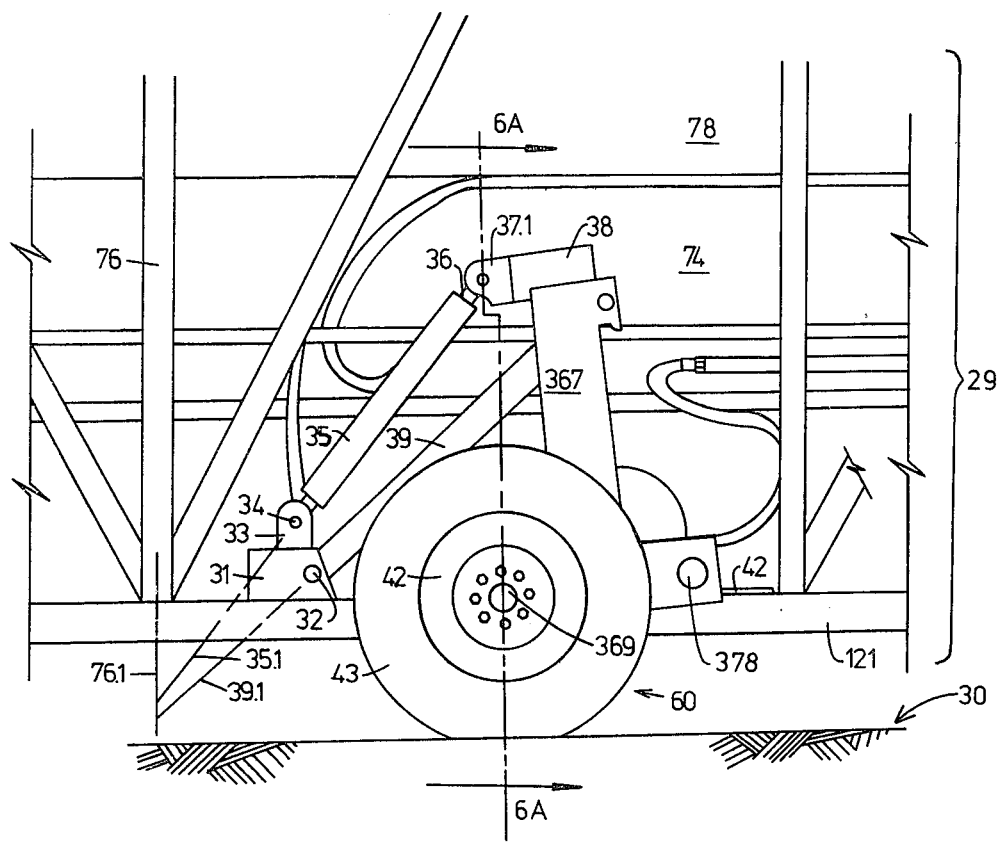
FIG. 3 is an enlarged side view of zone 3A of FIG. 2 to show the adjustable wheel assembly 60.

In the embodiment of FIGS. 1–15 overall dimensions are as set out in Table I (insert A) below:

TABLE I

| | | |
|---|---|---|
| 1. | Length of compartment 55 (wall 144 to wall 108) | 40 feet |
| 2. | Width of compartment 55 (wall 291–293) | 8 feet |
| 3. | Height of frame 300 (bottom of member 121 to top of member 118) | 9 feet |
| 4. | Walls 291, 292, 293, 294 | 12 ga. steel |
| 5. | Empty weight of assembly 29 | 12,000 pounds |
| 6. | Tires 71 and 43, outside diameter | 27 inches |
| | Tread width | 6 inches |
| | Pressure | 60 psig |
| | Size | 8.00 × 14.5 |
| 7. | Member 367, 368, x- section | 3"× 4" |
| 8. | Frame members 121 and 123, x-section | 2"× 2" |

DESCRIPTION OF THE PREFERRED EMBODIMENT

The mobile bin assembly 29 comprises, in operative combination, a rigid truss frame, a longitudinally extending bin 50, auger assemblies 81-84, wheel and wheel support assemblies as 60 on each side of the bin, a drawbar assembly 140 (or 180) and a power assembly, 99, in operative combination.

The bin 50, comprises in operative combination, a plurality of rigid walls as 108, 291-294 and 144 (FIGS. 1, 2, and 13) and a bin compartment, 55, therein. An operator's platform 125 is supported on the front bin wall 144. Portions of a truss frame 300 are firmly connected to the bin wall panels and supports those panels while the wall panels also strengthen the frame, the panels between the frame members acting as webs.

Figure 4:
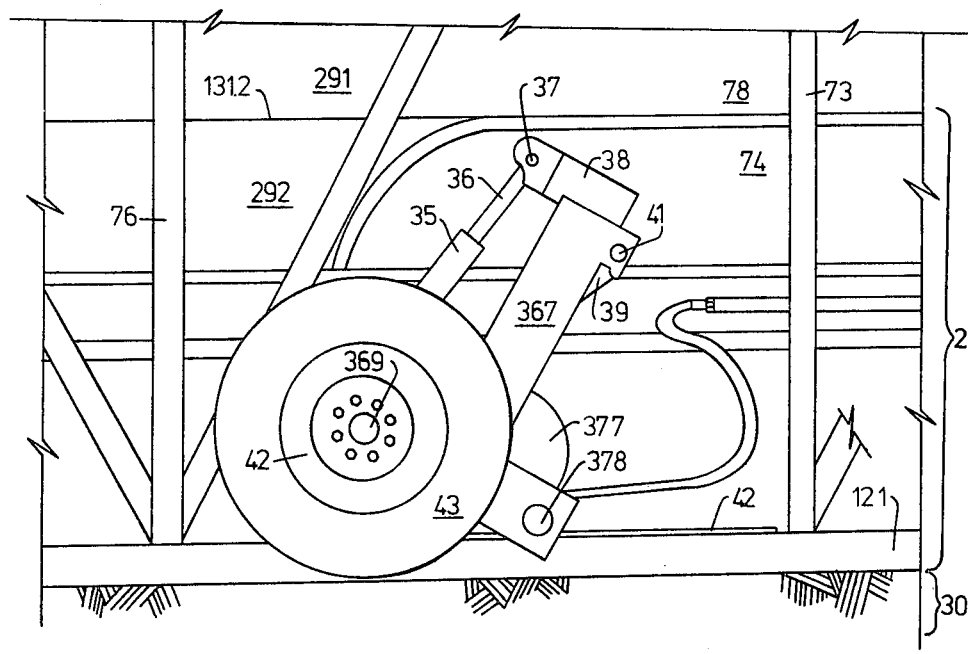
FIG. 4 is a side view of the wheel assembly shown in FIG. 3 at the same scale as in FIG. 3 when the bin is in its ground supported position.
Figure 5:
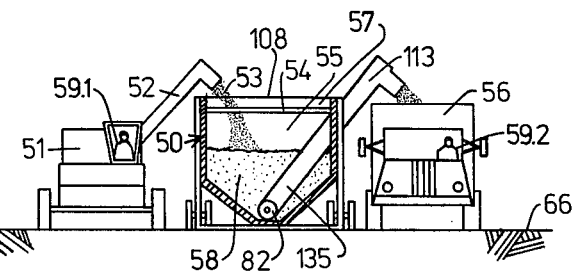
FIG. 5 is an overall diagrammatic view, in part through section 5A of FIG. 2, of bin assembly 29 to show the overall operation of the bin of the system in combination with other apparatuses used therewith (a harvester and a grain truck) in operation of the overall system comprising the bin of FIGS. 1-4.
Figure 16:
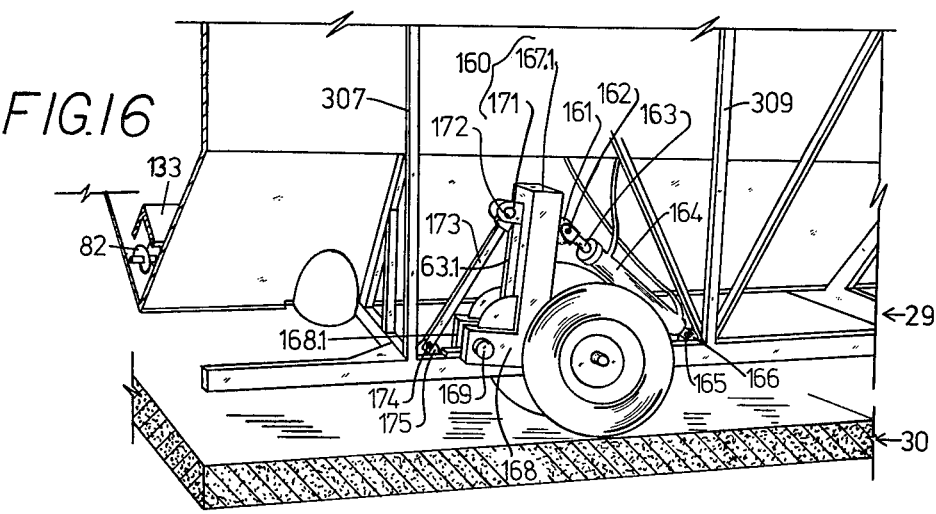
FIG. 16 is a side view of another bin support wheel assembly 170 shown in the bin elevating position generally as shown in FIG. 1 at ZONE 16A.
Figure 17:
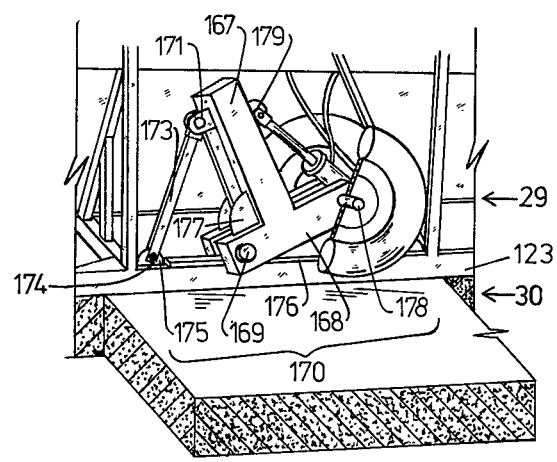
FIG. 17 is a partly cut away showing of the wheel support assembly 170 shown in FIG. 16 in the position of parts thereof where the apparatus 29 is in contact with the ground 30 during the operative position of the apparatus as shown in FIGS. 5 and 24.

In the fixed location condition of bin 29 when it is used to hold, mix and dispense grain while acting as in intermediate repository between the containers of a field gathering harvester truck 51 and a highway transport vehicle as 56 (in FIG,. 5) the lower beams as 121 and 123 of the truss framework of bin 29 are on the ground as shown in FIGS. 4, 5, and 17 and a power take-off shaft 188 is operatively connected to the power take-off 199 of the tractor 28 for mixing and discharge of the bin contents. Mobile bin 29 is, in its mobile condition, operatively attached to a tractor 28 by a drawbar assembly for longitudinal movement of the bin and the bin 29 frame is elevated over the ground 30 as shown in FIGS. 1, 2, 3, and 16 by the vertical extension of the extensible wheel and wheel support assemblies and by the drawbar adjustment assembly.

The walls of the bin assembly 50 are a vertically and longitudinally extending upper left side panel, 293, and a vertically and longitudinally extending upper right side panel, 291, spaced away from each other is a transverse direction, and a vertically and transversely extending front end panel, 144, and a vertically and transversely extending rear end panel 108, and a centrally and downwardly sloped longitudinally extending left bottom panel 294 and a centrally and downwardly sloped longitudinally extending right bottom panel 292. The left bottom panel has an upper longitudinally extending upper edge 131.1 and a lower longitudinally extending central bin bottom edge 131.3. The left upper longitudinally extending upper edge 131.1 is joined to and is coextensive with the bottom edge of upper left side panel 293. The right bottom panel 292 has an upper longitudinally extending side edge 131.2 and a lower longitudinally extending bottom central edge (coextensive with edge 131.3 of the left bottom panel.) The upper longitudinally extending side edge 131.2 of the right bottom panel 292 is coextensive with and firmly connected to the bottom edge of the upper right side panel 291. The transversely extending tropezoidal front end panel 144 and rear end panel 108 are joined to the front and rear ends respectively of upper side panels 291 and 293 respectively and to the front and rear ends of the bottom panels 292 and 294. The lower longitudinally extending bottom central edges of each of the bottom panels 292 and 294 are joined to each other at bottom bin edge 131.3.

An open topped bin compartment 55 is defined between the upper left and right side panels 292 and 294 and the front and rear end panels 108 and 144 and above the bottom panels 292 and 294.

A rigid operator support platform 125 is firmly attached to and supported on the front bin assembly wall 144 and is provided with rigid railings 127.1 and steps as 126 and located at a height permitting observation of the bin compartment 55 by an operator as 127 supported on that operator support platform as shown in FIG. 12.

The auger assemblies include a front auger sub-assembly, 82.1 a rear auger sub-assembly 83.1 and a central auger sub-assembly, 81.1.

The front auger assembly 82.1 comprises a longitudinally extending helical auger blade 82, and an auger blade support shaft 82.2, shaft supports as 82.4 rotatably attached to each end of the auger blade shaft and firmly attached to and located in the bottom of the bin compartment 55 above and parallel to the bottom bin edge. The blade extends from near to the front end of the bin compartment (i.e. from immediately to the rear of front bin panel 144) toward the middle of the bin compartment 55. A hydraulic drive auger motor 85 is operatively connected by pulley 141.1 and belt 142.1 to the front auger blade. A hydraulic valve control 93 is operatively connected to a hydraulic pump 89 as a power source and to the auger drive motor 85 whereby to independently vary the direction and speed of rotation of the front auger blade; the control valve 93 for the motor for front auger 82 is located in a panel 128 on the railing 127.1 adjacent the operator's support platform, 125 and within ready reach of the operator 127 while in position to observe the bin compartment 55, which compartment in within the walls of the bin assembly 50.

The front auger blade has front and rear V-shaped roof panels 133 and 134 thereabove; these panels slope laterally and downwardly from a center peak; and are firmly held a short distance (1-2 inches in the preferred embodiments) above and away from the front auger blade. Such roof panels are adjustably yet firmly held in position on rigid vertically extending threaded rods or columns as 130 (shown in FIG. 24) and 130.2, 130.21, and 130.22 (FIG. 13) between nuts adjustably yet firmly held on those columns. Longitudinally and vertically extending openings as 130.1 and 130.3 (shown in FIGS. 13 and 24) are formed between the lateral and edges of the roof panels as 133 and 134 and floor panels 292 and 294 and allow passage of grain as 58 in bin 55 to the auger blade as 82 under the roof panels 133 and 134.

The rear auger assembly 83.1 comprises a longitudinally extending helical auger blade 83, and an auger blade support shaft 109, firmly attached to and supporting the auger blade 83, and auger shaft supports such as 82.4 rotatably attached to each end of the auger blade shaft and firmly attached to and located in the bottom of the bin compartment 55 above and parallel to the bottom bin edge. The blade 83 extends from near to the rear end of the bin compartment i.e. from immediately to the front of rear bin panel 108 toward the middle of the bin compartment 55. A hydraulic drive auger motor 86 is operatively connected by pulleys 105, 106, and belt 107 to the shaft 109 of the rear auger blade. A hydraulic control valve 95 is operatively connected to the hydraulic pump 89 as a power source and to the auger drive motor 86 whereby to independently vary the direction and speed of rotation of the rear auger; the control valve 95 for the motor 86 for rear auger 83 is located in panel 128 on the railing 127.1 adjacent the operator's support platform, 125.

The rear auger blade has front and rear V-shaped roof panels 132 and 131 thereabove as 133 and 134 for auger 82. These roof panels 131 and 132 are held a short distance (1-2 inches in the preferred embodiments) above and away from the rear auger blade such roof panels are sloped downwardly and laterally from a central peak and are adjustably yet firmly held in position above the auger therebelow as are panels 133 and 134. Thereby longitudinally and vertically extending openings such as 130.1 and 130.3 are formed between the lateral edges of the roof panels as 131 and 132 and floor panels 292 and 294 to allow passage of grain as 58 to the auger blade as 83 under the roof panels 131 and 132 in the same manner as for panels 133 and 134 and auger blade 82.

The front auger has a rear, discharge end at 133.1 (FIG. 13) The rear auger has a front discharge end 132.1 located rearwardly of the discharge end of the front auger, as diagrammatically shown in FIG. 8 and pictorially in FIG. 13.

The central auger sub-assembly 81.1 comprises a central two-part auger 81 (which has two parts, 81.4 and 81.5) and and shells 113, 117, and 111 therefor and a motor for their blades. Assembly 81.1 extends vertically and transversely from a lower central end 81.2 in the bin compartment near the bottom thereof to an upper end 112 located, as shown as FIGS. 10 and 11, above the top edge of and substantially laterally beyond one side as 293 of the bin compartment 55.

The central auger assembly 81.1 comprises a lower central auger shell 117 a lower auger blade 81, an upper central auger blade 115, an upper central auger shell 113, an upper auger blade 81.5, a peripheral chute 111 and a hydraulic drive motor 87. The lower central auger shell 117 is a rigid tube that rotatably supports and houses the lower auger blade portion 81.4 as shown in FIG. 8. A drive motor 87 is operatively connected by a pulley and belt connection 87.1 (similar to the belt and pulley assembly of elements 105, 106, 107, and 109) to the shaft 113.2 of the lower auger blade 81 which shaft is fixed to the lower central auger helical blade. A hydraulic control valve assembly 94 for the central drive motor 87 for rotating the central auger 81 is also located on panel 128 and is operatively connected to pump 89 and motor 87.

Figure 10:
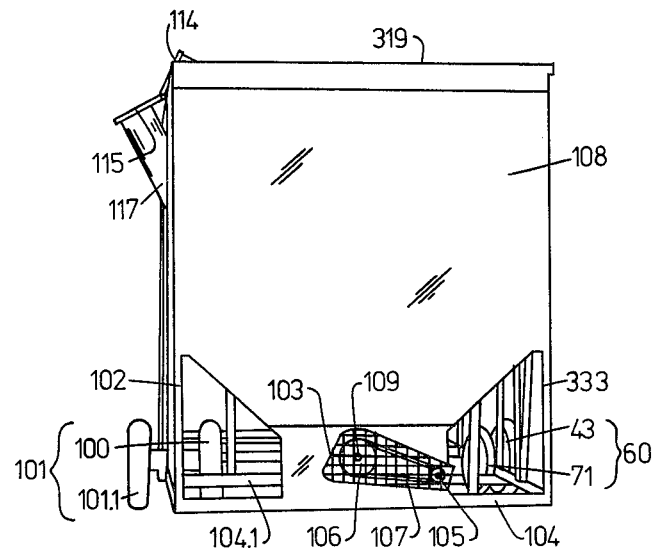
FIG. 10 is a rear view of the apparatus 29 as seen along the direction of the arrow 10A of FIG. 1.
Figure 11:
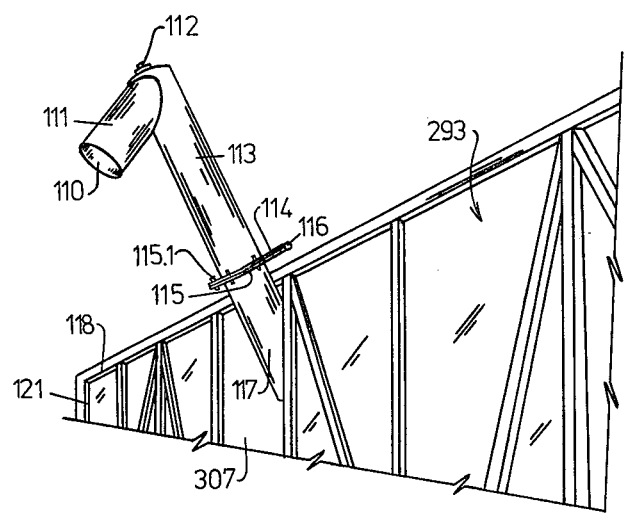
FIG. 11 is a perspective pictorial view from the rear and left side of the apparatus 29.
Figure 14:
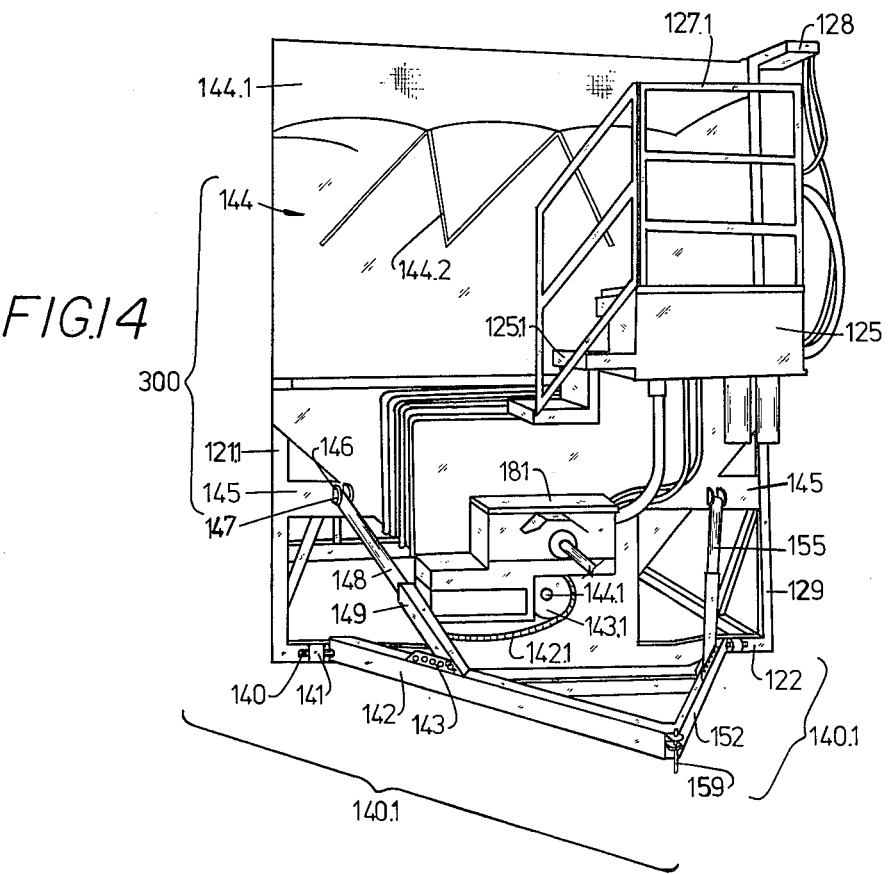
FIG. 14 is a front view of the front end of apparatus 29 illustrating a drawbar assembly 140.1.
Figure 15:
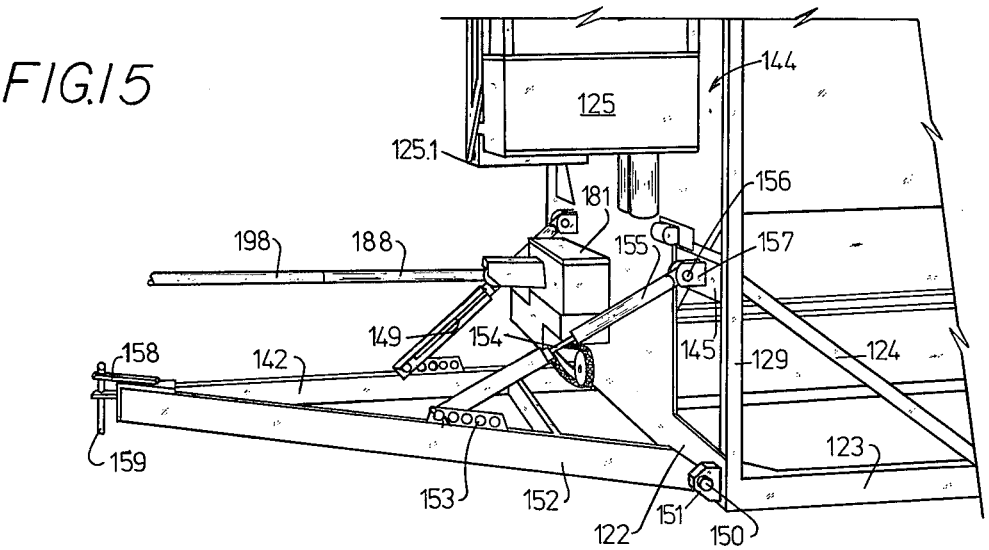
FIG. 15 is an oblique perspective view of the left front corner of the apparatus 29 to show the drawbar adjustment thereon.

The overall shell 135 for the central auger assembly is composed of a lower tube portion 117 and an upper tube portion 113 coaxial with the tube 117 the bottom of the upper auger shell portion 113 is firmly attached to a plate 114 and the top end of the lower auger shell 117 is firmlly attached to a lower flat orifice plate 115 (shown in FIG. 10). The plates 114 and 115 are flat and rigid and hingedly connected to each other at a pianl joint hinge 116 and have a coaxial central circular orifice of the same diameter size as the outer diameter of auger 81. The lower auger blade shaft 113.2 of blade 81 has an upper forked end. The upper auger blade shaft 113.1 has a lower forked end. These forked ends join, in the position thereof shown in FIGS. 8 and 11, to form a releasable drive joint or coupling 113.3. The upper auger shaft 113.1 of an upper auger blade portion 81.5 rotatably yet firmly held in upper auger shell 113. Piano hinge 116 has an axis of rotation parallel to and above and lateral to the upper edge of left panel 293 as shown in FIGS. 10, 11, and 12 to permit pivotal rotation of the upper chute 113 and the helical blade therein to a position extending into the bin compartment 55, as shown FIG. 10 (and in dotted line position 126.1 in FIG. 12). This pair of hinged orifice plates 114 and 115 is a structural provision for an alternate or travel positioning of the lateral portion of the discharge chutes 113 and 111, which positioning reduces the width of the roadway required for on the highway movement of the bin 29, as shown in FIG. 10. In operation, as shown in FIG. 5, the plates 115 and 114 are held together by bolts as 115.1 (FIG. 11).

The overall central auger shell 135 has a top lateral discharge chute 111 with outlet opening 111.1 at its lateral end, and an inlet opening 81.2 at its lower end. The inlet opening 81.2 is located to the rear of the front auger 82 and forward of the front end of the rear auger, and adjacent the bottom end of the central auger, as diagrammatically shown in FIG. 9. The central upper auger blade 81.5 is fixed to shaft 113.1 and extends upward from plate 114 (in position of parts shown in FIGS. 11 and 8) in upper auger chute 113 and a cylindrical discharge chute 111 extends laterally and downwards from the upper end 112 of chute 113 below the top thereof. The upper auger blade 81.5 is fixed to upper central auger shaft and is rotatably located in rigid cylindrical upper chute 113.

The bin frame 300 comprises a left side truss frame 316, and a right side truss frame 137, a front frame 318 and a rear frame 319 Each of the left and right side frames 316 and 317 respectively comprise rigid longitudinally side members 123 and 121 and upper side members 118 and 119, respectively. These rigid upper side longitudinal members are attached to the upper left and right side panels 293 and 291 near the top edge thereof and extending from the front to the rear of the bin compartment 55. The lower side longitudinal frame members 123 and 121 are located below the lower edges 131.2 and 131.1 of the side wall panels and below the bottom bin edge, 131.3. The left side frame 316 also comprises a plurality of rigid vertically extending members (291, 302, 304, 306, 307, 309, 311, 313, and 102 from front to rear, (FIG. 1) each attached firmly as by welding at its upper end to the upper left each side attached firmly longitudinal frame member 118 and also firmly attached at the adjacent portions of panel 293 above the level of lower edge 131.1 of the upper left panel 293— such firm attachment being by continuous welding—to the outer side of the upper left side panel 293 Each such vertically extending member is also attached firmly at its lower end to the lower side member 123. Rigid longitudinally extending diagonal frame members 301, 303, 305, 308, 310, 312, and 314 each, as 303, join an adjacent vertical member as 302 and 304 at its point of joining to the horizontal members as 123 and 118 and form a side truss frame structure, extending in a vertical and longitudinal plane.

The right side frame 317 also comprises a plurality of rigid vertically extending members 121.1, 322, 324, 326, 73, 76, 329, 331, and 333, (reading from front to rear as shown in FIG. 2) each attached firmly as by welding at its upper end to the upper right side longitudinal frame member 119 and each firmly attached to all of its upper portion, i.e., the portion above the level of lower edge 131.2 of the upper right panel 291—as by continuous or closely spaced spot welding—to the outer side of the upper right side panel 291. Each such vertically extending frame member is also similarly firmly attached at its lower end to a lower side frame member 121. Rigid vertically and longitudinally extending diagonal frame members 321, 323, 325, 327, 75, 328, 330, and 332, each, as 323, joined to adjacent vertical members at the points of their joining to the horizontal members as 121 and 119 and form a side truss structure, extending in a vertical and longitudinal plane transversely spaced from and parallel to frame 316.

The members as 301–314 are rigid steel ells. The side frames 316 and 317 are firmly jointed at their bottom longitudinal members (123 and 121) by rigid lower transverse frame members as 122, 122.1 (FIG. 12) 104, 104.1 firmly attached thereto rigid transverse upper frame members as 54 rigid ells or square sectioned tubing at top of rear frame 319 and front frame 144 are firmly attached at their ends to the upper longitudinal side members 118 and 119 of the side frame assemblies 316 and 317.

The adjustable wheel assemblies comprise a left wheel support assembly 101, and like right wheel support assembly 60; each of said wheel support assemblies is a mirror image of the other so the description of assembly 60 applies to assembly 101.

The right wheel support assembly 60 comprises a separate rigid movably mounted T-shaped wheel support frame, 70, a pivotal support link 39 for that wheel frame and an extensible wheel frame positioning piston shaft 36, and a left wheel and wheel assembly position drive piston 35; the left wheel support assembly 101 includes a corresponding left wheel and wheel assembly support drive piston 335.

The embodiment of movable wheel support frame 60 comprises a rigid vertically and longitudinally extending T-shaped movable frame 70 formed of inner and outer parallel vertical members 367 and 62 (FIG. 6) and inner and outer bars 63 and 368 firmly joined together respectively and with a reinforcing plate as 377 (For 367 and 368). A rigid lower front cylindrical shaft 378 is attached to the lower end of plates 368 and 63 and is located above a wear plate 42 fixed to beam 121. A rigid upper spacer block 38 is firmly joined to the top of plates 67 and 62; plate 38 has a rear fork 37.1 and pin 37 to which extensible piston shaft 36 is pivotally attached. A rigid pivot link 39 is attached pivotally at its rear to a pivot link pin 32 held in a base 31 fixed to frame member 121 near to a vertical frame member 76. The front upper end of rigid pivot link 39 is pivotally attached to a pivot pin 41 at top of members 62 and 367 as shown in FIGS. 3, 4, 6, and 7. The pins 37 and 41 are spaced apart from each other longitudinally. The extensible shaft 36 is longitudinally movable in a rigid hydraulic piston cylinder 35. The piston cylinder 35 is pivotally attached by a pin 34 to a clevis or fork 33 firmly attached to base 31. Plate 63 supports an inwardly extending axle 61 at its rear and plate 368 supports a laterally extending axle 369: axles 369 and 61 are co-axial and transverse to the length of bin 50. As outer wheel frame 42 and tire 43 are rotatably attached to outer axle 369 and an inner wheel frame 72 and tire 71 are rotatably attached to axle 61. Thereby the upper end 38 of the rigid movable wheel support frame 70 is firmly yet pivotally attached to the bin frame adjacent to the vertically extending frame member 76 by the pivotal support link 39 pin 32 and base 31. The pivotal support link 39 is a rigid arm pivotally attached to one end to the pin 41 in the rigid movable wheel support and another end thereof is pivotally attached to the bin frame at pin 32.

The extensible piston shaft 36 and poston cylinder 35 provides an extensible assembly with a rigid end connector at each end thereof, one end thereof, 36, is pivotally attached to the wheel support frame at a point thereon (37) spaced apart from the attachment thereto (at 41) of the pivotal link 39. The other of the rigid ends of piston 35 is pivotally attached to the bin frame at pin 34 which is only slightly spaced away from the point of attachment to said bin frame of link 39 and the line of force 35.1, which is compressive, in the weight supporting postion of assembly 60 passes along the point of attachment of the bin frame to the extensible assembly (pin 34, cylinder 35, shaft 36, pin 37) and intersects the line of force 39.1 through the pivotal support assembly (pin 32, link 39, pin 41) at a point along the straight line of length (76.1) of the adjacent straight vertical frame member, 76 (as shown diagramatically in FIG. 3).

Figure 6:
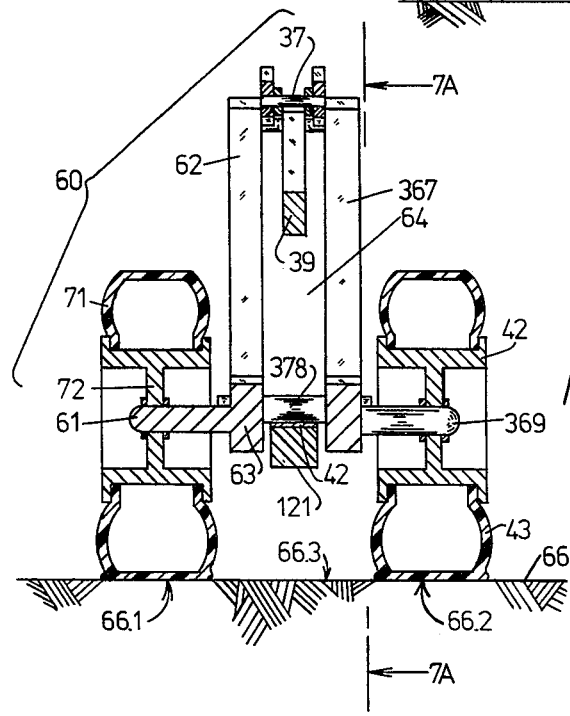
FIG. 6 is a transverse sectional view through the vertical plane 6A-6B of FIG. 3 to illustrate the relations of the components of the wheel assembly bin support unit in the position thereof shown in FIG. 3.
Figure 7:
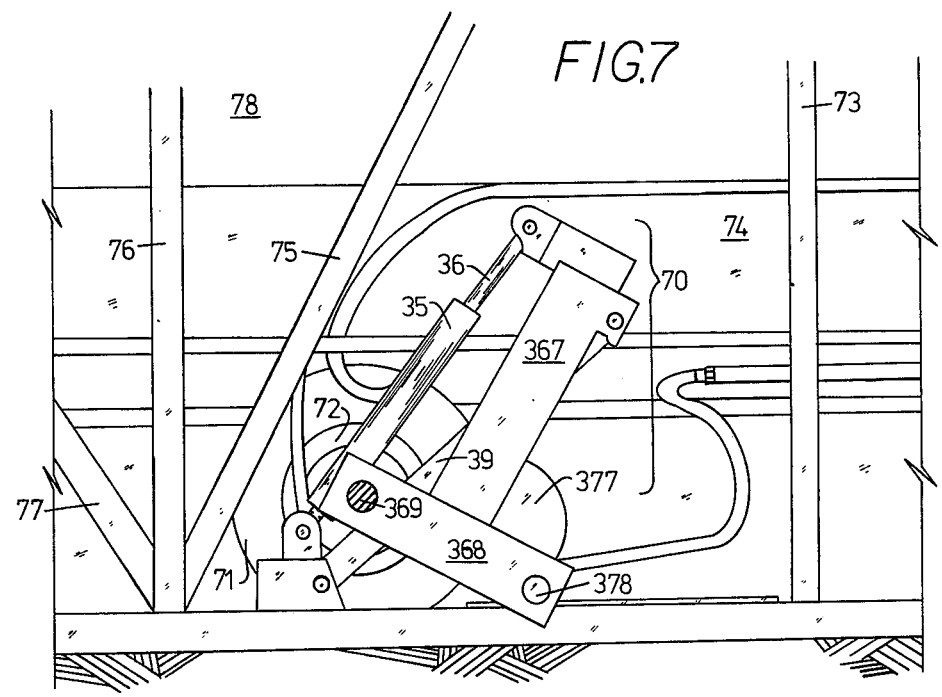
FIG. 7 is a vertical longitudinal section through the vertical plane 7A—7A of FIG. 6 in the position of the parts of apparatus shown in FIG. 4.

This wheel adjustment assembly provides that the wheels may be raised relative to frame 300 from the position shown in FIGS. 3 and 6 to the position shown in FIGS. 4 and 7 thereby the bin compartment 50 is supported in the ground through its frame members as 123 and 121 which rest on the ground for the full length of the frame while a load of grain is held in the bin compartment 55; the wheel as 101, 100, 43 and 71 support no part of the load then in the bin: accordingly the wheel and wheel support assemblies may be light. Each of the pivotal elements as 35 and 39 and 367 of assemblies 60 and 101 force a shaft as 378 firmly against a plate 42 in the fully elevated bin position. Stress due to road travel is applied directly to the frame members as 76 adjacent to the attachment of the wheel support assembly and from that member to the panel 291. The panel 291 and truss members attached thereto form a vertically rigid structure. The wheels are readily moved into and out of vertically extended position and vertical movement of the bin compartment that might damage the bin by conventional springing is avoided.

The hydraulic piston 35 is operatively connected to and actuates the extensible shaft 36. A hydraulic control valve 91 is, as shown in FIG. 8, operatively connected to the hydraulic pump 89 and to the piston 35: that valve, 91, like valves 91–96, 271 and 272 is located adjacent the operator's support platform in panel 128.

The hydraulic control valve 92 is operatively connected to a hydraulic piston 335 for the extensible shaft like 36 for actuation of the wheels 100 and 101.1 of assembly 101 comparable to wheels 43 and 71 of adjustable wheel assembly 60 on a frame 70.1 like frame 70.

An adjustable drawbar assembly 140.1 comprises rigid left and right drawbar arms 142 and 152, in form of a rigid forwardly directed Vee (or V) shape. A hitch clevis 158 and hitch pin 159 are at the front end thereof. The arms 142 and 152 are pivotally attached by rigidly left and right ears 151 and 141 rigidly attached to a front transverse frame member 122. Left and right drawbar pins 140 and 150 pivotally connect the drawbar frame arm members 142 and 152 to the ears 151 and 141.

A pair of extensible hydraulic pistons assemblies left and right piston cylinder 155 and 148 with extensible left and right piston shafts 149 and 154, respectively, are pivotally attached at their rear ends to rigid transverse front frame member 145 located above the transverse front member 122 by left and right lugs 156 and 146 in that bracket and left and right pivot pins 157 and 147 fixed to those piston ends and connecting those piston ends to those lugs or ears. The forward ends of the left and right piston shafts are connected by rigid ells to holes in plates 153 and 143 respectively, for adjustment of length as needed.

A hydraulic control valve 96 is operatively connected to each of pistons 148 and 155 and the power source 90. Valve 96 is located in panel 128 on the railing 127.1 of the operator support platform 125.

Figure 25:
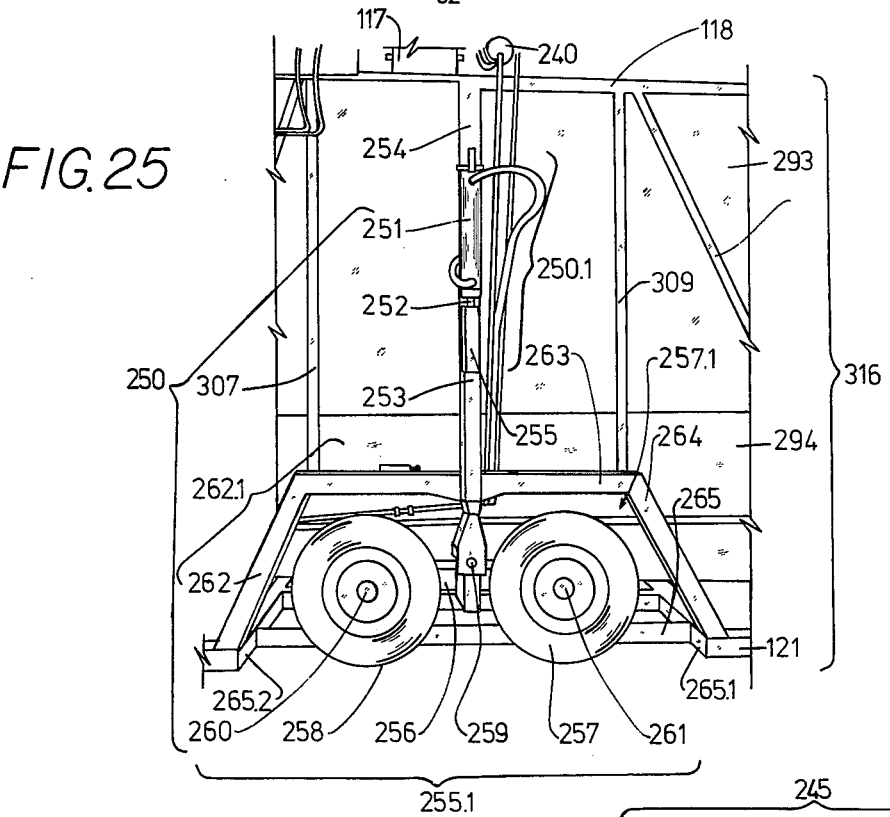
FIG. 25 is a side view of a ZONE corresponding to ZONE 16A of the apparatus shown in FIG. 1 utilizing another embodiment of wheel assembly.

The wheels 43, 71, 100 and 101.1 of the assemblies 60 and 101, and the like functioning assemblies 70 and 250 of FIGS. 17 and 25 respectively, are located, as shown in FIGS. 1 and 2 closer to the rear wall 108 of the bin assembly 55 then to the front wall 144 thereof. The operator platform 125 and the hydraulic pump 89 and return tank 88 and drawbar assembly 140 or 180 are also located on or forward of the front bin wall. Accordingly the vertical location of the side frames 316 and 317 relative to the ground therebelow, as 66 is controlled by the postioning of the drawbar assembly as 140.1 or 180 and the wheel assemblies as 60 and 101 or 170. Accordingly, with the motor of the tractor 28 operating and powering pump 89 and the drawbar assembly attached to the tractor 28, the operator 127 at the panel 128 may raise and lower the front end of the bin frame relative to the ground by operating valve 96 and the positioning of pistons 35 and 335—which is also controlled by a operator as 127 operating valves as 91 and 92 at panel 128—provides for vertical positioning of the remaining portion of the bin assembly 29.

The arms 368 and 63 of the wheel frame 70 loosely engage the sides of the bottom longitudinal side member 121 continuously while action of the piston 35 moves the axles 61 and 369 from the lowest position thereof (relative to frame 317) as shown in FIG. 4 to the highest position of those axles (as shown on FIG. 6). The cylindrical pins as 31 and 34 and 41 and 37.1 that hold the upper end of assembly 60 in position primarily provide for pivotal movement of the elements attached thereto about the longitudinal axes of those pins as the center of rotation of such pivotal motion and those pins are elongated in directions parallel to each other and transverse to the length of the bin chamber. While there is some small (1 to 2 degrees) rotation about axes transverse to the length of those pins by the elements attached to those pins, the great length of arm 367 above beam 121 relative to the distance of axles 61 and 369 below beam 121—FIGS. 3, 4, and 6 are to scale—prevents any substantial movement of the center of the areas of contact of wheels 43 and 71 (and wheels 100 and 101.1 of assembly 101 likewise) from moving away from the vertical plane in which the frame (317) and panel (291) supporting the wheel assembly (60) lies. The remaining structure of assembly 60 provides for the vertical movement and adjustment of the wheels of wheel assembly 60 being in the plane of the wall structure 317.

The wheel and wheel support assemblies 60 and 101 provide independently vertically adjustable left and right sets of wheels (171, 43, 101.1, 100) and also provide that each such wheel set is independently movable up and down in a plane parallel to the side frame as 316 and 317 on which such wheel set, as 71 and 43 on the right side and 101.1 and 100 on the left, is supported. Further, the area of contact of 66.1 and 66.2 of the wheels 71 and 43 of each wheel assembly as 60 with the ground as 66 therebelow in the mobile condition of the bin 29, as shown in FIGS. 6 and 9 are located symmetrically on both sides of a center line, as 66.3 which lies on surface of road 66 in the vertical longitudinal plane in which the side wall and frame as 31 lies and to which (side wall) the wheel frame support assembly as 60 is attached.

The relative position of the ground support area as 66.1 and 66.2 of each wheel as 43 and 71 is readily adjustable vertically relative to its side frame as 317 by movement of the wheels, as 43 and 71 in a plane parallel to that side frame on which such wheel support assembly as 60 is supported. Each wheel and wheel support assembly as 60 (and like assembly 101) thus provides for maintaining the side wall frame thereabove as 316 (and 317) vertical even when the bin 29 is moved along one side of a typical farm road with a high crown as shown in FIG. 9; this is done by actuation of the wheel assembly as 70 to extend vertically sufficiently to keep the frame walls 316 and 317 vertical, while support assembly 70 is extended assembly 101 is not extended; the vertically deminsionally stable structure provided by frame 316 prevent sagging of the rear and of the bin and allows this differential of height to be maintained. The line 66.4 in FIG. 9 indicates the horizontal plane therein.

The wheel support assemblies as 60 and 101 and the similarly functioning structures of FIGS. 16, 17, and 25 (assemblies 170 and 250) provide that the bin 29 in its mobile condition reliably and safely and controllably move in a straight line behind a tractor, as 28, drawing it along such a crowned road as one set of wheels, (as 101.1 and 100) is readily located by hydraulic control assembly 99 at a higher or different vertical level than the other set (such as wheels 71 and 43) to provide such relationship and maintain it. The vertically dimensional stable wall structure is provided by cooperation of the truss frame 300 and the large vertical height of the wall panels as 293 and 291 (which act as reinforcement for such truss structure) provides a rigid vertically deep beam member firmly resisting any vertical movement up and down from the position provided thereto by the drawbar attachment adjustment assembly as in FIGS. 14, 15, and 18–23 and the wheel support frame positioning pistons as 35 adn 335 of assemblies 60 and 101 and the similar wheel positioning assemblies of FIGS. 16, 17, and 25.

Accordingly the rear end of the bin 50 does not shake or vibrate vertically to any appreciable degree during movement of bin 29 along the usual unimproved unpaved roads hence allows full use of the difference of the vertical extensibility of the left and right wheel and wheel support frame assemblies as 60, 170, and 250.

A tarpaulin 144.1 is usually applied and held by cables as 144.2 over the top of the bin compartment 55 to protect the contents therein from weather during storage and to improve road trailing characteristics of assembly 29 during windy days.

Each of valve 91-96 in panel 128 is similar to valve 96 and comprises a throttle and cut-off valve as 97, the body of which (99) is operatively connected to a high pressure line 90. A movable spool, 98, is located in valve body 99 and has conventional internal connection for forward, reverse and hold position and a control handle as 89 as diagrammatically shown in FIG. 8A.

A discharge chamber is formed within the upper chute 113 and is located adjacent the upper end of the central auger 81. That chamber has an opening adjacent the upper end of the auger 81 (discharge) end, and a rigid horizontally extending upper chute 111 extends laterally from that discharge chamber to an outlet 111.1. In operation grain is passes by and from auger 82 and 83 to auger 81 and to chute 111 to fill an open topped grain truck 56 located to the side of bin 55 when the bin 29 is in its fixedly located operative condition, as in FIG. 5 with a mass of grain 58 therein. Such mass of grain comes from a harvester truck 51 which discharges through a chute no. 2 a stream of grain 53 to the interior of bin compartment 55 on the bin assembly 50. In that position of bin 29 the wheels of the wheel support assemblies as 60 and 101 are raised to a vertical level at which the bottom of such wheels are higher than the bottom of side bottom longitudinal frame members as 121 and 123 respectfully as shown in FIGS. 4 and 7.

Figure 24:
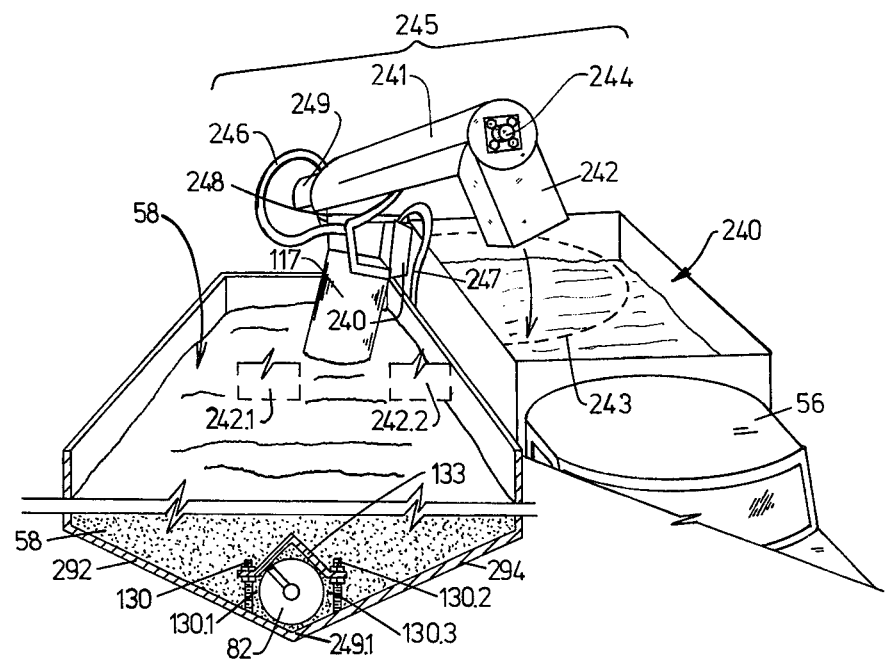
FIG. 24 is a perspective view of the movable upper auger assembly 245 in its discharge operation.
Figure 27:
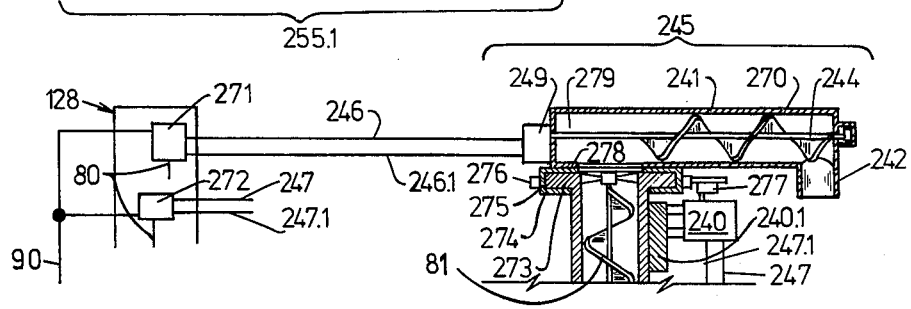
FIG. 27 is a diagrammatic showing of the mechanical and hydraulic components and connections thereof for the movable upper auger discharge assembly.

In an alternative embodiment, shown in FIGS. 24 and 27 the pivotal or rotatable auger assembly 245 of FIGS. 24 and 27 is used in place of the pivotal assembly comprising auger blade 81.5 and tube 113 of FIG. 8.

The movable assembly 245 comprise a rotatable upper auger 270 fixed to a shaft 244 which is rotatably mounted in a shell 241. The shaft 244 is connected to and driven by a hydraulic motor 249. The motor 249 is connected by hydraulic lines 246 and 246.1 to a control valve 271 on panel 128.

A rotatable support 248 assembly 245 is formed by an outwardly or radially extending circular lip 273 on tube wall 117. A lower plate 274 with a circular orifice fits around tube 117 under lip 273 and is attached to a circular rim plate 275. The rim plate is firmly held to a top plate 278. Plate 278 is fixed to tube 241. And hydraulic motor 274 is attached by bracket 240.1 to shell 117. A chain 276 is fixed to rim 275 and is engaged by a gear 277. Gear 277 is driven by hydraulic motor 240. Lines 247.1 and 247 connect motor 240 to valve 272 in control panel 128. The rotatable chute support plate assembly 248 rotatably supports the auger 245; in one position, as shown in FIG. 24, assembly 245 extends transverse to the length of bin compartment 55. By controlling the motor 240 the assembly 245 is rotated and may extend forward of the chute 117 to a position as shown as 242.2 or 242.1 in FIG. 24; there the assembly 245 extends forwardly and does not extend transverse to the bin and provides for decreased overall width and transportation of the bin assembly is facilitated. The upper chute positioning motor 240 is operatively connected to the chute 245 for movement thereof. The outer end 242 of the chute assembly 245 may be rotated in the path as 243 within the container of a truck 56 so as to longitudinally distribute the grain passed from the mass 58 in the bin compartment 55 to an even height within the container compartment 240 of the truck 56. This may be done by an operator standing in position of operator 127 in FIG. 12 and such distribution to the truck 56 may be effected while that bin 29 is being loaded as shown in FIG. 5 by the truck operation of 56 so that no time is wasted by the truck operator in waiting for his truck to be loaded. This arrangement also provides for an even distribution of the grain in the truck 56 while the truck is stationary rather than requiring the truck 56 to be moved longitudinally of the bin assembly 29 during such loading.

This assembly 245 when placed in position as 242 and 241 in FIG. 24 also provides that a mass of grain as 58 in the bin compartment 55 may be moved by movement rearwardly of auger 82 and then be moved from the rear end of that auger 82 to the bottom end of auger 81, then up the chute 117 to chute 241, then by auger 270 to end 242 therof, then at the front end of bin 55, and then to the portion of mass 58 at the front end of bin 55, then downward to the front end of auger 82 and back again to auger 81, and thereby provide circulation and mixing of the grain in the holding bin 29. Alternatively, the chute 245 may be directed by motor 240 and valve 272 toward the rear of the bin compartment 55 and grain circulation in bin 55 may be from the mass as 58 within the bin forwardly by auger 83, then upwardly along auger 81 and then rearwardly along auger 270 and then back to top of mass 58 at rear of bin 55, and then again to auger 83.

In embodiments of FIGS. 16 and 17 the left wheel support assembly 170 comprises a separate rigid movably mounted T-shaped wheel support frame 160, like 70, and a pivotal support link 173, like 39, for that wheel frame and an extensible wheel frame positioning piston shaft 163, like 30, and a left wheel and wheel assembly position drive piston cylinder 164, like 35; the right wheel support assembly then includes a corresponding right wheel and wheel assembly support drive piston.

The embodiment of movable wheel support frame 160 comprises a rigid vertically and longitudinally extending T-shaped movable frame that is formed of like inner and outer parallel vertical members 167 and 63.1 (like 367 and 62 in FIG. 6) and like rigid inner and outer bars 168 and 168.1 firmly joined together respectively with a reinforcing plate as 177 (for 167 and 168). A rigid lower front cylindrical shaft 169 is attached to the lower ends of bars 168 and 168.1 and is located above a wear plate 176 fixed to beam 123. A rigid upper spacer block like 38 is firmly joined to the top of plates as 167; that block, 167.1, like plate 38, has a rear lug, 161, and pin, 179, to which extensible piston shaft 163 is pivotally attached. A rigid pivot link 173 is attached pivotally at its front to a pivot link pin 174 held in a ear 175 fixed to frame member 123 near to a vertical frame member 307. The rear upper end of rigid pivot link 173 is pivotally attached to a pivot pin 172 at top of member 167 as shown in FIG. 16. The pins 172 and 179 are spaced apart from each other longitudinally. The extensible shaft 163 is longitudinally movable in a rigid hydraulic piston cylinder 164. The piston cylinder 164 is pivotally attached by a pin 166 to a clevis or fork 165 firmly attached to base member 123 near vertical frame member 309. Inner bar 168.1 supports an inwardly extending axle like 61 at its rear end; plate 168 supports a corresponding laterally extending axle 178 (like 369): these axles, like 369 and 61, are co-axial and transverse to the length of bin 50. As outer wheel frame as 42 and tire as 43 are rotatably attached to outer axle 169 and a corresponding inner wheel frame as the tire as 71 are rotatably attached to axle of member 63.1. Thereby the upper end of the rigid movable wheel support frame 160 is firmly yet pivotally attached to the bin frame adjacent to the vertically extending frame member 307 and 309 by the pivotal support link 173 pin 174 and ear 175. The pivotal support link 173 is a rigid arm, pivotally attached at one end to the pin 172 in the rigid movable wheel support frame 160 and its other and is pivotally attached to the bin frame at pin 174.

The extensible piston shaft 163 and piston cylinder 164 provide an extensible assembly with a rigid end connector at each end thereof; one end thereof, 162 is pivotally attached to the wheel support frame at a point thereon (lug 161) spaced apart from the attachment thereto (at 171) of the pivotal link 173. The opposite end of cylinder 164 is pivotally attached to the bin frame at pin 165 which is joined to an ear 165. Ear 165 is firmly joined to longitudinal side member 123 adjacent to vertical frame member 309.

This wheel adjustment assembly provides elevation of the bin frame side walls by movement of the support wheels in a plane parallel to and with center thereof substantially coplanar with the frame wall to which attached, as do wheel support assemblies 70 and 101 above discussed as well as that the wheels may be raised relative to frame 300 from the position shown in FIG. 16 to the position thereof shown in FIG. 17 and thereby, as for assemblies 70 and 101, the bin compartment 50 is supported on the ground through its frame members as 123 and 121 which rest on the ground for the full length of the frame while a load of grain in held in the bin compartment 55 and the wheels of each assembly as 170 then support no part of the load then in the bin.

In the use of wheel and wheel support assembly 170 of FIGS. 16 and 17 in place of assemblies as 70 and 101 in the assembly 29, the hydraulic piston 164 is operatively connected to and acutates the extensible shaft therefor, as 163, and hydraulic control valve 92 is, as shown in FIG. 8, operatively connected to the hydraulic pump 89 and to the piston 164 and hydraulic control valve 91 is operatively connected to the piston in the wheel support assembly corresponding to assembly 170 on the other side of bin assembly 29.

The solid angle of the bottom wall panels as 292 and 294 with the horizontal is 34°; the panels bottom panels provide a rigid ribbed corner structure at the bottom edge 31.3 which edge is rigid in the transverse and vertical direction and limits side-to-side sway of the vertically extended side wall panels as 291 and 293 The stiffness of the vertical panels 291 and 293 and their resistance to change in vertical dimensions permits a large differential in height of walls 316 and 317 for a small vertical extension of the wheels from the bin frame edge in the grain holding position thereof, as in FIGS. 4, 5, 17, and 25.

The substantially vertically extending (in position shown in FIG. 3) frame member 367 and 63 of frame 60 (and like members 167 and 63.1 of assembly 160) are rigid sturdy steel (about 3 × 6 inches) bars (note FIGS. 1, 2, 3, 4, 6, 7, 16, and 17 are to scale) and the horizontally extending (in FIG. 3) bars 63 and 368 of frame 60 are also rigid sturdy steel bar rectangular in section (about 3 × 6 inches) as are the members 169 and 168.1 of FIG. 16. The frames 70 and 160 are structurally and functionally the same although the pivotal and extensible link connections thereof to the bin frame on wheel supported are different, and the referent members are different because of necessity therefor to avoid confusion in the description of the different overall assemblies.

The horizontal (in FIGS. 3 and 16) lower bar members as 368, and 63 in FIG. 3 and 168 and 168.1 in FIG. 16) are firmly held to the vertically extending members thereabove (as 63 for member and for member) by welding and a reinforcing web plate as 177. The vertically extending frame members (as 367 and 63 in assembly 70, as well as the like members 167 and 63.1 in assembly 160) are held firmly and spaced apart by a rigid plate (as 38 and 167.1) at their upper ends (as shown in FIGS. 6 and 16 for assemblies 43 and 160 respectively): parallel spaced apart lower horizontally extending members as 368 and 63 in assembly 60 and similar members 168 and 168.1 in assembly 160 are firmly attached to by the rigid bar therebetween (bar 378 in assembly 60 and bar 169 in assembly 160) and thereby held in firm fixed spatial relationship to each other by that rigid bar. The vertical paired members 368 and 63 and 168 and 168.1 as well as the horizontal members 63 and 368 and 168 and 168.1 are parallel to each other and spaced apart only far enough to form a easily sliding fit on the adjacent side surfaces of the longitudinally extending bottom side frame member (121 in FIG. 3, 123 in FIG. 16).

The bottom members 368 and 63 and 168 and 168.1 each have a flat side facing the bin frame member (as 121 or 123) to which such wheel frame member is adjacent as shown (in FIGS. 6 and 17) The vertically and longitudinally extending surfaces of the pivotally movable wheel support frame members (of frames 70 and 160) central and lateral of the adjacent side frame member as 121 or 123 are thus held in a close but slidable fit with that longitudinally extending bottom side frame member as 121 or 123 in the use in assembly 29 of the wheel and wheel support assemblies as 60 and 101 shown in FIGS. 3–6 and in the use of the wheel and wheel support assemblies as 170 shown in FIGS. 16 and 17 for bin assembly 29. Each support frame, as 70 and 160 is accordingly shaped like an inverted letter "U" when seen in transverse cross section, as in FIG. 6 although shaped like an inverted "T" when seen from the side, as shown in FIGS. 7 and 17. The axles on each U-shaped sectioned wheel support frame, as axles as 61 and 369 on frame 60—and like axles on the frame 160 of assembly 170—which axles support the wheels as 71 and 43 respectively are accordingly constrained to move vertically and longitudinally only in vertically and longitudinally extending planes (in flat surfaces) each at a fixed horizontal distance from the frame member (as 121 or 123) located between, or embraced by, the horizontally extending members, as 368 and 63 (or 168 and 168.1) of that wheel support frame.

Therefore, in the operation of raising and lowering of the wheel and wheel support assemblies — as 70 and 170 of FIG. 6 and of FIG. 16 — the center — as 66.3 — of the overall areas of the wheels ground support of each such wheel and wheel support assembly, as 101 (in FIGS. 9 and 10) is located substantially in the plane of the bin wall side frame, as 316, to which side wall frame such wheel and wheel support assembly (101 or 160) is attached when the side frame is vertical as in FIG. 9.

The bin assembly 29 is also made in a 45 ft. × 9 ft. high × 9 ft. wide size having a carrying capacity of 150,000 lbs. of grain. FIG. 25 shows the wheel and wheel support assembly 250 in such modification: it uses 9L – 15 size tires. Such tires have a tread diameter of 8 inches, a wheel diameter of 15 inches, an outside diameter (as axle 260 to edge of tire 258) of 28 inches, and have an outside chamber wall width distance (parallel to axle 260) of 8½ inches. Corresponding data for tire 43 are 6 inch tread, 14.5 in. wheel diameter, outside diameter of 27 inches, and wall width of 6½ inches. While the radii of the wheels 43 and 71 and 258 and 257 used in the particular embodiments shown are about 15 inches, larger diameter wheels may be used, and while the stroke or vertical motion of the wheel support assemblies applied to the wheels of the wheel and wheel support assemblies is about 20 inches in the particular embodiments 70, 170 and 250 shown, larger stroke movements are within the scope of apparatuses and process steps herein disclosed, although the stroke and wheel diameters above disclosed are adequate for the purpose of wall alignment discussed for use on conventional farm roads with usual slope of 6 to 12 inches in 10 feet of road width on one side thereof.

The wheel and wheel suport assembly 250 comprises a vertically movable wheel support frame sub-assembly 250.1 and a wheel frame positioning sub-assembly 255.1. The wheel frame positioning sub-assembly 250.1 comprises a vertically extending frame post 254, a piston cylinder 251, a positioning piston shaft 252 and a yoke positioning sleeve 253 and a frame arch sub-assembly 262.1. The movable wheel support frame sub-assembly 255.1 comprises a vertically extending rigid yoke 255, a horizontally extending rigid longitudinal axle arm 256, axles 260 and 261, and a pair of tandem wheels 258 and 257.

Axles 260 and 261 extend horizontally, transversely, and laterally from and are rigidly and firmly fixed to arm 256 and parallel to each other and rotatably support wheels 258 and 257 of equal size. (9L–15 size)

The lower longitudinal member 123 of side frame 316 is broken away near the position of the central auger 81 to provide, as shown in FIG. 25, a frame arch sub-assembly 262.1. Arch sub-assembly 262 is composed of front vertically extending arch arm 262, a top longitudinally and horizontally extending frame arch arm 263, a rear vertically extending arch arm 264, a lower longitudinal well arm 265, and lower transverse well frame member 265.1 and 265.2.

Vertical support arm 254 is a rigid vertical steel beam firmly attached to plate 293 and upper longitudinal frame beam 118. Arch beams 262, 263, and 264 are rigid beams firmly attached to each other and vertical beams 307 and 309 of side frame 316. Transverse members 265.1 and 265.2 are firmly attached at their lateral ends to frame members 121 and 123 and lower longitudinal low arm 265 is a rigid arm firmly attached at its front and rear ends to transverse members 265.1 and 265.2 centrally of the wheels 257 and 258 in well 257.1.

The yoke 255 is firmly yet pivotally fixed by a rigid pivot pin 259 to rigid arm 256 at a fork at the bottom of yoke 255. At its top yoke 256 is a rigid beam of rectangular cross section and is firmly yet slidably held by sleeve 253 of similar internal cross section. Yoke 256 is firmly attached at its upper end to the lower end of piston 252 and is moved up and down by the piston shaft 252. Piston shaft 252 is slidably held in piston cylinder 251 for vertical motion therein.

The extensible piston shaft 252 and piston cylinder 251 provide an extensible assembly with a rigid end connector at each end thereof; the lower end of shaft 252 is attached to the wheel support frame yoke arm 255. The other of the rigid ends of piston cylinder 251 is attached to the bin frame at arm 254.

This wheel adjustment assembly provides elevation of the bin frame side walls by movement of the wheels 257 and 258 in a plane parallel to and substantially coplanar with the frame wall to which attached, as do wheel support assemblies 70 and 101 above discussed as well as that the wheels may be raised relative to frame 300 to the positon shown in FIG. 25 and thereby, as for assemblies 70 and 101, the bin compartment 50 is then supported on the ground through its frame members as 123 and 121 which rest on the ground for the full length of the frame while a load of grain is held in the bin compartment 55 and the wheels of each assembly as 250 then support no part of the load then in the bin.

In the use of wheel and wheel support assembly 250 of FIG. 25 in place of assemblies as 70 and 101 or assemblies as 170 in the bin assembly 29 the hydraulic piston 251 is operatively connected to and acutates the extensible shaft therefor, as 252 and hydraulic control valve 92 is, as shown in FIG. 8, operatively connected to the hydraulic pump 89 and to the piston 251 and hydraulic control valve 91 is operatively connected to the piston in the wheel support assembly corresponding to assembly 250 on the other side of bin assembly 29.

The wheel support assemblies, as 60 and 170 as well as wheel support assembly 250 thus maintain like alignment relations of the bin side frames as 316 and the wheels on the wheel support assemblies (as wheels 43 and 71 on assembly 60 and wheels 101.1 and 100 on assembly 101 and like wheels on the wheel support assemblies as 160) attached to such bin side frames and as provided by wheels 258 and 257 of wheel and wheel support assembly 250.

Panel 291 (like 293) is 5 feet high from its bottom edge 296 (like 297) to its top at beam 119 (like 118) in the 40' × 8' × 8' embodiment of FIGS. 1, 2, and 10 and the volume of the bin compartment 55 in that 40 foot long, 8 foot high, 8 foot wide embodiment is 1840 cubic feet.

Figure 18:
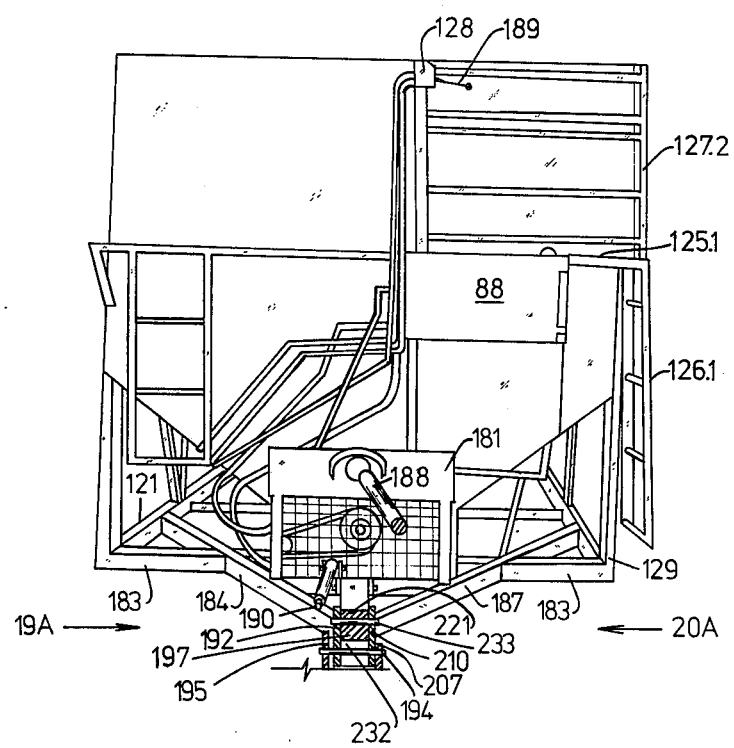
FIG. 18 is in part a front end view of the front end of the bin with another drawbar assembly (180) than the assembly 140.1 shown in FIGS. 14 an is also, in part, a sectional view through transverse vertical plane 18A—18A of FIG. 19.

An adjustable drawbar assembly 180 may be used in place of the drawbar assembly 140.1. Drawbar assembly assembly 180 comprises rigid left and right drawbar arms 184 and 187, in form of a rigid forwardly directed Vee (or V) shape. The arme 184 and 187 are firmly attached to a front transverse frame member 183 identical to frame member 122 of FIG. 12. FIG. 18 shows at 125.1 a variation of the operator support platform 125 and a variation of the location of steps (126.1) to the platform from the steps 126 in FIG. 12. The railing 127.2 functionally corresponds to railing 127.1 of FIG. 12 and supports the valve control panel 128 thereon. The rear end of a pivotally supported beam center arm 197 is supported on a pin 216 and lug 217 and a hitch plate 203 is at its front end thereof rigidified by a web plate 213. A hitch plate clevis 204 and hitch pin 202 are at the front end of the plate 203. A reinforcing pillar plate is firmly attached to the top of the arm 197 over a notch 232 for a pin 194. A series of rigid links 207, 209, 269 and plate 195 and their connecting pins 268, 218, 294 connecting the pins and piston 190 serves to raise and lower the front end of the frame 300 on actuation of the piston assembly composed of shaft 190 and cylinder 191 when the clevis 204 is firmly attached to the hitch as 201 of a tractor as 208 through the pin 202 of the clevis 204.

The extensible piston shaft 190 actuated by piston 191 is pivotally connected by a clevis 212 and pin 211 to a rigid longitudinally and vertically extending control plate 195. Plate 195 is pivotally supported on pin 194. The plate 192 is firmly attached to arm 184 and like rigid plate 210 is firmly attached to arm 187. Plates 192 and 210 may be joined firmly in spaced apart relation to each other and on each side of beam 197.

A lower front pin 268 forwardly and longitudinally spaced from the rear control plate pin 194 is releasably held in the plate 195 by the cotter pin 196. The pin 268 is connected by rigid links 209 and 269 to pin 218. Pin 218 is rotatably and firmly connected in the base pillar block 221.

In operation of the drawbar raising apparatus in FIGS. 19-23 as well as the drawbar assembly 140 and the wheel and wheel frame support assemblies 70, 101, 160, and 250, the tractor 28 has the power take-off 205 thereof connected by telescoping tubes 198 and 188 to the pump 89 which pump is located on a bracket as 181 on the front frame 144 generally as shown in FIGS. 19-23 and diagrammatically in FIG. 8.

In operation the extensible piston shaft 190 is actuated by power to the piston 194. That piston bears against a pin 214 on ear 215 on the transverse frame member 183 annd move the plate 195 in a clockwise direction as shown in FIG. 19 to raise the frame members 184 and 187 to be adjacent to the arm 197. When the piston 191 is actuated in the opposite direction the plate 195 rotates counterclockwise (as shown in FIG. 22) about the pin 196 and lowers the pin 194, thereby putting the front end of frame 300 on the ground 30 as shown in FIG. 22.

In the raised position of the frame 300 as shown in FIG. 20 a locking pin 233 passes through the hole 234 in the plate 210 and hole 231 in block 221. In such position of the pin 233 where at its locks the plate 210, the arms 187 and 184 are held upwards.

The piston 191 is connected to the valve 96 in place of the pistons 148 and 155 and the position of the arm 197 relative to the frame 300 is controlled by the operator 127 by his actuation of the valve 96 in the panel 128 in the same manner as actuation of the drawbar assembly 140 would have been effected: in the embodiment shown, the distance between axis of pin 194 and 268 is 12 inches: between 268 and 211 is 14 inches; between pins 268 and 218 is 12 inches.

In combination with the wheel and wheel support assemblied 60, 170, and 250 shown in FIGS. 1, 2, 6, 7, 16 and 25 the adjustability of the height of the front end of the bin compartment by adjustment of the extensible piston shafts of such drawbar assemblies as 140.1 and 180 allows a horizontal positioning of the lowermost longitudinal members as 121 and 123 of the bin wall side frames as 316 and 317 close to but reliably spaced from the road surface and provides, accordingly, a maximum use of the available differential in height of the side frames provided by the wheel and wheel support assemblies of the bin assembly 29.

Farm roads have slopes from ¼ inch to 2 inches per foot in a lateral direction, with shoulders formed on relatively soft dirt so that tilting a mobile bin on such roads is a serious problem during transport; such problem is overcome by the bin assembly 29 and its process of operation as herein described.

In its operation (as well as structurally) bin assembly 29 may use the drawbar apparatus 140 (of FIG. 14) or apparatus 180 (of FIG. 18) and may use or incorporate the wheel and wheel support assemblies 60 and 101 (of FIGS. 3.4, 6, and 7) [assembly 101 is a mirror image duplicate of assembly 101] or the wheel and wheel support assemblies as 170 with a corresponding assembly on the opposite side of bin frame 300, (such corresponding wheel and wheel support assembly being a mirror image of assembly 170) or using the wheel and wheel support assembly 250 and a corresponding assembly on the opposite side of bin frame 300, such corresponding assembly being a mirror image of assembly 250. In operation, all of such alternative apparatuses are used in combination with a tractor as 28 operatively connected to the bin assembly 29 by as shown in FIGS. 1, 2, 8, 19, 20 with the drawbar assembly 140 or 180 for traction and lifting of frame 300 and operatively connected by a power take-off shaft, as telescoping splined shafts 188 and 189, converted at its front to the tractor power take-off 199 by a universal joint as 205 and at its rear to the hydraulic pump 89.

In operation the tractor 28 draws the bin 29 to transport that large holding bin as 27 from one site of operation as in FIG. 5 to another along one side of a laterally downwardly sloped road as in FIGS. 9 and 10 while the drawbar assembly and the wheels and wheel supporting assemblies as 70 and 101 (or 160 or 250) are in their bin frame raising position is shown in FIGS. 1, 2, 3, 6, 9, 16, and 25. During such process of transportation the lateral side wall as 291 of that bin is raised to a greater height over the ground on which supported than the height of the more central wall 293 of that bin over the ground on which that more central wall is supported. Such raising is effected by applying the tractor engine power to the pump 89 and driving hydraulic fluid 88.1 in system 99 through valves 91 and 92 to piston cylinders as 35 and 335 of assembly 60 and 101 or like pistons as 164 of assembly 170 or piston as 251 of assembly 250 as well as the pistons of the drawbar assembly used to extend such pistons and holding the drawbar assembly and the wheel support frame assemblies in desired position by locking or closing the hydraulic control valve thereto (as 96) in hold position and so holding such wheel support frames assemblies and drawbar assemblies in desired extended position.

To provide the best tracking characteristics, at a given slope of road (as shown by angle between plane 66,4 and surface of road 66 in FIG. 9) which is usually the most severe slope expected to be met during travel of the empty bin assembly 29 the wheel assemblies are extended and walls 291 and 294 are raised by the hydraulic assembly 99 over the ground supporting the wheel assemblies as above described so that the walls 291 and 294 will be vertical in such expected worst condition, as when moving the bin assembly along one side of a sloped road and it is to be moved further to the side to allow other vehicles to pass. Such raising is done prior to initial transport or may be effected during transport by an operator on platform 125 during such transport of the bin assembly.

Accordingly, in usual travel over a crowned road at a downward and lateral slope less than the worst expected, the lateral wall of the bin and the central wall are parallel to each other and both are directed upwardly at an angle less than 90° from a horizontal plane as 90.1 located between the inner and outer wall by one to three degrees (1° to 3°). The vertical positioning of the side walls provided by the selective and adjustable extensibility of the wheels (and wheel support assemblies) attached thereto substantially increases the effective strength and dimensional stability of those walls in the vertical plane and make transport of the assembly 29 on sloped or crowned country roads controllable, rapid and safe. However, a small (1° to 3°) tilt centrally is toleratable and improves control along roads although at a slight but negligible decrease in vertical rigidity. Such minor tilting of the bin usually is also used to tilt the bin walls upward and towards a direction from which wind is coming when the bin 29 is drawn on a road in a direction transverse to direction of a crosswind. During such travel along a transversely downwardly sloped road, where the central wall as 293 and wall frame 316 are spaced at a lesser height from the road therebelow than the lateral wall as 291 and wall frame as 317 in assembly 29, the differential in height over the sloped road as 66 (FIG. 9) of the lateral and central wall frames produced by the difference in vertical extension of the wheel and wheel support frames of bin assembly 29 from frame 300 is not counteracted and vitiated by the lack of vertical dimensional stability of the walls and, also, such differential in vertical extension of the wheels and wheel support frames is accomplished with a minimum increase of the total height of the assembly 29 during its travel along a usual crowned country road; in particular, this structure of bin assembly permits passing under overpasses where a maximum permissible vertical height of vehicle to pass thereunder limits vehicle height. The rigidity of the bin frame in the vertical direction results from the cooperation of the height of the panels 221, and 293 used as very deep although thin beams to which stress is transferred by the vertically extending members as 301–314 and 321–332. As shown in FIGS. 1, 2, 12, 14, and 18, the railing as 127.1 and 127.2 and control panel 128 are close to but below the upper edge of frame 300.

After such travel of the bin assembly 29 over a road as 66 while connected to and behind a tractor as 28, the bin assembly 29 is drawn by the tractor 28 to a site in a cultivated field, as in FIG. 5, whereat harvesters as 51 may transfer grain to the bin assembly compartment 55. During such off-the-road travel to such site in a cultivated field, the hydraulic system 99, especially valves 91, 92, and 96 is activated by an operator as 127 at panel 128 to extend the piston shafts of the wheel and support assemblies, as shafts 36, 163, or 252 of assemblies 70, 170 or 259 respectively, and firmly locate the wheels of such assemblies at the maximum vertical extension position thereof as well as bring the drawbar assembly positioning pistons to a position of the front end of frame 300 (e g member 122) corresponding to a substantially horizontal position of the lower members as 121 and 123 of the frame assembly 300, This actuation of the hydraulic assembly 99 and assemblies connected thereto extends the bin frame to its maximum height of about 10 inches over the surface of the usually rough ground found in cultivated fields and raises the bin walls from the somewhat lower road travel position of the unequally and less vertically extended position of wheel and wheel support assemblies. Such raised position of the bin frame improves maneuverability of the bin assembly 29.

After the bin assembly 29 is located at its site of intended operation as in FIG. 5 the hydraulic system control valves 91, 92, and 96 are then manipulated to retract the piston shafts of the wheel and wheel support assemblies and the wheels of those wheel and wheel support assemblies are withdrawn from a position extending beyond the frame and supporting the bin compartment as in FIGS. 3 and 16 to a position within the vertical outline thereof as in FIGS. 4, 16, and 25, whereupon the lower beams of 121 and 123 of the truss framework of bin 29 rest on the ground as shown in FIGS. 4, 5, 7, 17, and 25.

After the bin assembly 29 is located at the site of its intended operation as a holding bin, a conventional harvester or field truck carriers as 51 with carrier compartment grain capacity of 18,000 to 20,000 pounds of grain, gather crops from a field. A driver, as 59.1 in such carrier locates the carrier adjacent assembly 29 and deposits the grain 53 or other crop carried in the carrier 51 as by a chute 52 therein, into the bin compartment 55, as diagrammatically shown in FIG. 5. The bin compartment has a large capacity e.g. over 130,000 pounds of grain which is a very large multiple of the field carrier capacity and provides for a substantially uninterruptable repository for discharge of the contents of the field carriers rather than depend on use of road transport type vehicles or trucks for such holding: aside from the potential interruptability of availability of such trucks or vehicles as repositories for the materials carried by the field carriers, the economic cost of paying drivers of such trucks while waiting for such trucks to be filled is a detriment avoided by the use of the bin assembly 29.

By operation of the auger assembly 245, which is pivotally movable above the vertically extending axis of central longitudinal axis of the central auger 81 (and tube 117), successive increments of the volume of grain 58 are transferred from bin compartment 55 (by the operator 127 operating auger 82 or 83 and 81 and 270) to open-topped containers as 240 on vehicles as 56 while such vehicle as 56 are stationary.

The operator 127 positions the auger assembly 245 by operating hydraulic control valve 272 to locate the auger assembly with its outlet orifice 242 extending transversely from and laterally of the bin compartment 55: its horizontal distance from axle of auger 81 to center of discharge orifice 242 of auger assembly 245 is 8 to 12 feet. The operator 127 using the control valves of panel 128 drives material as grain 58 from the bin compartment 55 along auger 82 or 83 to auger 81 and therefrom to the chamber within auger tube 241, thence by auger 270 (driven by motor 249 and controlled at hydraulic control valve 271) to discharge orifice 242. The auger outlet orifice 242 may be moved intermittently or continuously along a circular path 243 overlying the top of the bin compartment 240; such curved path of travel 243 extends along the length of the open-topped carrier chamber 240 of the truck 56. Accordingly, when the truck 56 parks parallel to bin compartment 55 with the middle of carrier chamber 240 located closely adjacent bin compartment 50 so that vertical plane transverse to the length of chamber 55 passing through the auger 61 also passes through a vertical plane equidistant from the front and rear of carrier compartment, 240 the material passed from chamber 55 to chamber 240 will have an even maximum top height from front to rear of the carrier when the distance from front to rear of that carrier compartment is not greater than twice the horizontal length of auger 245. The weight carried by usual 20 feet long grain carriers 56 is about 30,000 lbs. of grain: accordingly the holding bin assembly 29, even when only one half full, holds a substantial multiple of the volume to load any such one truck as 56 and therefore provides a steady source of transportable material for such trucks with an absence of delay in filling such trucks because of the usual waiting for each of a series of small volume containers as are carried by the field carriers as 51 to fill such trucks.

The bin assembly 29 is used to mix the grain in chamber 55 continuously between periods of discharge therefrom; with the central auger apparatus of FIGS. 10 and 11 mixing is effected by passage of grain from front portion of chamber 55 to its center along augers 82 and 83 and vice versa and with gravity providing flow from center to the bin compartment end.

We claim:

1. A mobile bin assembly comprising, in operative combination, a frame, a longitudinally extending bin, auger assemblies, wheel and wheel support assemblies, a drawbar assembly and a power assembly, all in operative combination, Said bin comprising, in operative combination, a plurality of walls, a bin compartment therein, and an operator's compartment supported by one of the walls, portions of said frame operatively connected to said walls, Said walls comprising a vertically and longitudinally extending upper left side panel and vertically and longitudinally extending upper right side panel spaced away from each other in a transverse direction and a vertically and transversely extending front end panel and a vertically and transversely extending rear end panel, and centrally and downwardly sloped longitudinally extending left bottom panel and a centrally and downwardly sloped longitudinally extending right bottom panel, said left bottom panel having an upper longitudinally extending upper edge and a lower longitudinally extending central bottom edge, said left upper longitudinally extending upper edge being joined to a bottom edge of said upper left side panel; said right bottom panel having an upper longitudinally extending side edge and a lower longitudinally extending bottom central edge, said upper longitudinally extending side edge of the right bottom panel connected to the bottom edge of the upper right side panel, said transversely extending front and rear end panels joined to the front and rear ends of said upper side panels respectively and, respectively, to the front and rear ends of said bottom panels, the lower longitudinally extending bottom central edge of each of said bottom panels being joined to each other at a bottom bin edge, A bin compartment defined between said upper left and right side panels and said front and rear end panels and above said bottom panels, An operator support platform on said bin assembly wall and located at a height permitting observation of the interior of the bin compartment by an operator supported on said operator support platform, Said auger assemblies comprising a front auger sub-assembly, a rear auger sub-assembly and a central auger sub-assembly, said front auger assembly comprising a longitudinally extending auger blade and supports therefor located in the bottom of the bin compartment above said bottom bin edge and extending from the front end of the bin compartment toward the middle thereof, a first drive means operatively connected to said front auger blade and control means operatively connected to a power source and to said auger drive means whereby to independently vary the speed of said front auger, said control means for said front auger located adjacent said operator's support platform, Said rear auger assembly comprising a longitudinally extending auger blade and support therefor located in the bottom of the bin compartment and extending from the rear of said bin compartment toward the middle thereof, second drive means operatively connected to said rear auger blade, and second control means operatively connected to a power source and to said second auger drive means whereby to independently vary the speed of said rear auger, said second control means located adjacent said operator's support platform, Said front auger having a rear, discharge end and said rear auger having a front discharge end located rearwardly of the discharge end of the front auger, Said central auger sub-assembly comprising a central auger extending vertically and transversely from a lower end in said bin compartment near the bottom thereof to an upper end located above the top of and beyond one side of said bin compartment, said central auger assembly also comprising a central auger shell surrounding said auger, a third drive means operatively connected to said central auger and a third control means for said third drive means for said central auger located adjacent said operator's support platform Said central auger shell having a discharge opening at its upper end near the upper end of said central auger and an inlet opening at its lower end, said inlet located to the rear end of the front auger and forward of the discharge the front end of the rear auger, and adjacent the bottom end of the central auger, Said bin frame comprising a left side frame, and a right side frame, a front frame, and a rear frame, each of said side frames comprising horizontally extending lower side members and upper side members, said rigid upper side members attached to the upper side panels near the top edge thereof and extending from the front to the rear of said bin compartment, the lower side frame member located below the lower edge of the side wall panels and below the bottom bin edge, a plurality of rigid vertically extending members each attached at its upper end to the upper side panels and attached at its lower end to a lower side frame member, and rigid vertically and longitudinally extending diagonal frame members joined to said vertical members at the points of joining thereof to said horizontal members and forming a truss structure, Said wheel assembly comprising a left wheel support assembly and right wheel support assembly, each of said wheel support assemblies comprising a separate rigid movably mounted wheel support frame, movable support means for said wheel frame, extensible positioning means for said wheel frame, and a plurality of wheels and wheel assembly drive means, said support means for said wheel frame holding said wheel frame to a bin side frame for vertical motion parallel to said frame and operatively connected to and held in position by said extensible wheel frame positioning means, A fourth drive means operatively connected to said extensible wheel frame positioning means; a fourth control means for said fourth drive means operatively connected to a power source and to said fourth drive means, said fourth control means for said fourth drive means located adjacent said operator's support platform Adjustable drawbar means comprising a rigid drawbar attachment pivotally attached to said bin frame at the front end of said frame, drawbar attachment adjustment means comprising an extensible means attached at one end to said bin frame and at another end to said drawbar attachment adjustment means, a fifth drive means operatively attached to said extensible attachment adjustment means, a fifth control means for said extensible attachment adjustment means connected to a power source and to said fifth drive means, said fifth control means located adjacent said operator support platform, and A discharge chamber located adjacent said central auger discharge, said chamber having an opening adjacent said central auger discharge end, and a rigid horizontally extending upper chute extending from said discharge chamber.

2. Apparatus as in claim 1 comprising also, in operative combination therewith, rotatable support means operatively attached to said upper chute for support of said upper chute in one position where the upper chute extends forward of the central chute and parallel to the length of said bin and, in another position transverse to the length of said bin compartment, and, in another position, rearward of the central chute and parallel to the length of the bin compartment; upper chute positioning means operatively connected to said upper chute for movement of said upper chute; sixth drive means attached to said upper chute positioning means, a sixth control means for said upper chute positioning means operatively connected to a power source and to said sixth control means, said sixth control means located adjacent said operator support platform.

3. Apparatus as in claim 2 comprising also, in operative combination therewith, an auger in said upper chute, seventh drive means operatively connected to said auger in said upper chute, seventh control means for said auger in said upper chute operatively connected to a power source and to said seventh drive means, said seventh control means located adjacent said operator support platform.

4. Apparatus as in claim 1, wherein said movable support means for said wheel frame comprises a rigid vertically and longitudinally extending member and a transverse extending axle, a wheel rotatably attached to said axle, one end of said rigid movable wheel support frame being firmly yet pivotally attached to said bin frame adjacent to a vertically extending frame member of said frame by said pivotal support means, said pivotal support means being a rigid arm, said arm pivotally attached at one end to said rigid movable wheel support, another end thereof pivotally attached to said bin frame, and Said extensible wheel frame positioning means comprising an extensible assembly with rigid end means at each end thereof, one of said ends means pivotally attached to said wheel support frame at a point thereon spaced apart from the attachment of said pivotal frame support means to said bin frame, the other of said rigid ends of said extensible wheel frame positioning means being pivotally attached to said bin frame at a point thereon spaced away from the first point of attachment to said bin frame of said pivotal support means.

5. A mobile bin assembly comprising, in operative combination, a frame, a longitudinally extending bin, auger assemblies, wheel and wheel support assemblies, a drawbar assembly and a power assembly, all in operative combination, Said bin comprising, in operative combination, a plurality of walls, and a bin compartment therein, with portions of said frame operatively connected to said walls, Said walls comprising a vertically and longitudinally extending upper left side panel and vertically and longitudinally extending upper right side panel spaced away from each other in a transverse direction and a vertically and transversely extending front end panel and a vertically and transversely extending rear end panel, and centrally and downwardly sloped longitudinally extending left bottom panel and a centrally and downwardly sloped longitudinally extending right bottom panel, said left bottom panel having an upper longitudinally extending upper edge and a lower longitudinally extending central bottom edge, said left upper longitudinally extending upper edge being joined to a bottom edge of said upper left side panel; said right bottom panel having an upper longitudinally extending side edge and a lower longitudinally extending bottom central edge, said upper longitudinally extending side edge of the right bottom panel connected to the bottom edge of the upper right side panel, said transversely extending front and rear end panels joined to the front and rear ends of said upper side panels respectively and, respectively, to the front and rear ends of said bottom panels, the lower longitudinally extending bottom central edge of each of said bottom panels being joined to each other at a bottom bin edge, A bin compartment defined between said upper left and right side panels and said front and rear end panels and above said bottom panels, Said auger assemblies comprising a front auger sub-assembly, a rear auger sub-assembly and a central auger sub-assembly, said front auger assembly comprising a longitudinally extending auger blade and supports therefor located in the bottom of the bin compartment above said bottom bin edge and extending from the front end of the bin compartment toward the middle thereof, a first drive means operatively connected to said front auger blade and control means operatively connected to a power source and to said auger drive means, Said rear auger assembly comprising a longitudinally extending auger blade and support therefor located in the bottom of the bin compartment and extending from the rear of said bin compartment toward the middle thereof, second drive means operatively connected to said rear auger blade, and second control means operatively connected to a power source and to said second auger drive means, Said front auger having a rear, discharge end and said rear auger having a front discharge end located rearwardly of the discharge end of the front auger, Said central auger sub-assembly comprising a central auger extending vertically and transversely from a lower end in said bin compartment near the bottom thereof to an upper end located above the top of and beyond one side of said bin compartment, said central auger assembly also comprising a central auger shell surrounding said auger, a third drive means operatively connected to said central auger, Said central auger shell having a discharge opening at its upper end near the upper end of said central auger and an inlet opening at its lower end, said inlet located to the rear end of the front auger and forward of the discharge the front end of the rear auger, and adjacent the bottom end of the central auger, Said bin frame comprising a left side frame, and a right side frame, a front frame, and a rear frame, each of said side frames comprising horizontally extending lower side members and upper side members, said rigid upper side members attached to the upper side panels near the top edge thereof and extending from the front to the rear of said bin compartment, the lower side frame member located below the lower edge of the side wall panels and below the bin edge, a plurality of rigid vertically extending members each attached at its upper end to the upper side panels and attached at its lower end to a lower side frame member, Said wheel assembly comprising a left wheel support assembly and right wheel support assembly, each of said wheel support assemblies comprising a separate rigid movably mounted wheel support frame, movable support means for said wheel frame, extensible positioning means for said wheel frame, and a plurality of wheels and wheel assembly drive means, said support means for said wheel frame holding said wheel frame to a bin side frame for vertical motion parallel to said frame and operatively connected to and held in position by said extensible wheel frame positioning means, and A fourth drive means operatively connected to said extensible wheel frame positioning means; a fourth control means for said fourth drive means operatively connected to a power source and to said fourth drive means.

* * * * *